United States Patent
Foley et al.

(10) Patent No.: US 11,861,561 B2
(45) Date of Patent: Jan. 2, 2024

(54) COLLABORATION SYSTEM INCLUDING A SPATIAL EVENT MAP

(71) Applicant: Haworth, Inc., Holland, MI (US)

(72) Inventors: David M. Foley, Seattle, WA (US); Adam Pearson, Seattle, WA (US); Demian Entrekin, Oakland, CA (US)

(73) Assignee: HAWORTH, INC., Holland, MI (US)

( * ) Notice: Subject to any disclaimer, the term of this patent is extended or adjusted under 35 U.S.C. 154(b) by 0 days.

(21) Appl. No.: 17/972,483

(22) Filed: Oct. 24, 2022

(65) Prior Publication Data

US 2023/0111762 A1    Apr. 13, 2023

Related U.S. Application Data

(63) Continuation of application No. 17/201,574, filed on Mar. 15, 2021, now Pat. No. 11,481,730, which is a
(Continued)

(51) Int. Cl.
*G06Q 10/101* (2023.01)
*G06F 16/176* (2019.01)
(Continued)

(52) U.S. Cl.
CPC ......... *G06Q 10/101* (2013.01); *G06F 16/176* (2019.01); *H04L 12/1822* (2013.01);
(Continued)

(58) Field of Classification Search
CPC . G06F 3/1454; G06F 3/04883; G06Q 10/101; G09G 5/14; G09G 2340/0407
See application file for complete search history.

(56) References Cited

U.S. PATENT DOCUMENTS 4,686,332 A    8/1987  Greanias et al.
5,008,853 A    4/1991  Bly et al.
(Continued)

FOREIGN PATENT DOCUMENTS

AU    2014275495 B2    12/2015
CN    101630240 A     1/2010
(Continued)

OTHER PUBLICATIONS

CN 201480039006.8—First Office Action dated Jul. 28, 2017, 20 pages.
(Continued)

*Primary Examiner* — James T Tsai
(74) *Attorney, Agent, or Firm* — Haynes Beffel & Wolfeld LLP; Andrew L. Dunlap

(57) ABSTRACT

A spatial event map system including server-side data processor that maintains a spatial event map which locates events in a workspace. The spatial event map includes a log of events, entries in the log having a location of an object of the event in the workspace and a time. The system includes logic to send messages including a location of an object of the event in the workspace and a time of the event to client-side network nodes; and to receive messages identifying events that create or modify an object, and to add corresponding entries to the log of events. The events can include history events that are sent to the other client-side network nodes, and added to the log for the corresponding history events, and ephemeral events that are sent to other client-side network nodes without adding corresponding entries in the log.

20 Claims, 17 Drawing Sheets

Related U.S. Application Data continuation of application No. 15/668,009, filed on Aug. 3, 2017, now Pat. No. 10,949,806, which is a continuation of application No. 14/090,830, filed on Nov. 26, 2013, now Pat. No. 10,304,037, which is a continuation-in-part of application No. 13/759,017, filed on Feb. 4, 2013, now Pat. No. 9,479,548.

(60) Provisional application No. 61/832,106, filed on Jun. 6, 2013.

(51) Int. Cl.
    *H04L 12/18*     (2006.01)
    *H04N 7/15*     (2006.01)
    *H04N 7/14*     (2006.01)
    *H04L 67/10*     (2022.01)
    *H04L 67/1095*     (2022.01)
    *H04L 65/403*     (2022.01)

(52) U.S. Cl.
    CPC ............ *H04L 65/403* (2013.01); *H04L 67/10* (2013.01); *H04L 67/1095* (2013.01); *H04N 7/147* (2013.01); *H04N 7/15* (2013.01)

(56) References Cited

U.S. PATENT DOCUMENTS

| | | |
|---|---|---|
| 5,220,657 A | 6/1993 | Bly et al. |
| 5,309,555 A | 5/1994 | Akins et al. |
| 5,394,521 A | 2/1995 | Henderson, Jr. et al. |
| 5,446,842 A | 8/1995 | Schaeffer et al. |
| 5,537,526 A | 7/1996 | Anderson et al. |
| 5,563,996 A | 10/1996 | Tchao |
| 5,613,134 A | 3/1997 | Lucus et al. |
| 5,689,628 A | 11/1997 | Robertson |
| 5,727,002 A | 3/1998 | Miller et al. |
| 5,781,732 A | 7/1998 | Adams |
| 5,812,847 A | 9/1998 | Joshi et al. |
| 5,818,425 A | 10/1998 | Want et al. |
| 5,835,713 A | 11/1998 | FitzPatrick et al. |
| 5,867,156 A | 2/1999 | Beard et al. |
| 5,872,924 A | 2/1999 | Nakayama et al. |
| 5,938,724 A | 8/1999 | Pommier et al. |
| 5,940,082 A | 8/1999 | Brinegar et al. |
| 6,078,921 A | 6/2000 | Kelley |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Ieperen |
| 6,342,906 B1 | 1/2002 | Kumar et al. |
| 6,343,313 B1 | 1/2002 | Salesky et al. |
| 6,518,957 B1 | 2/2003 | Ehtinen et al. |
| 6,564,246 B1 | 5/2003 | Varma et al. |
| 6,710,790 B1 | 3/2004 | Fagioli |
| 6,778,989 B2 | 8/2004 | Bates et al. |
| 6,911,987 B1 | 6/2005 | Mairs et al. |
| 6,930,673 B2 | 8/2005 | Kaye et al. |
| 6,930,679 B2 | 8/2005 | Wu et al. |
| 7,003,728 B2 | 2/2006 | Berque |
| 7,043,529 B1 | 5/2006 | Simonoff |
| 7,100,195 B1 | 8/2006 | Underwood |
| 7,129,934 B2 | 10/2006 | Luman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 7,908,325 B1 | 3/2011 | Pabla et al. |
| 8,209,308 B2 | 6/2012 | Rueben et al. |
| D664,562 S | 7/2012 | McCain et al. |
| 8,402,391 B1 | 3/2013 | Doray et al. |
| 8,407,290 B2 | 3/2013 | Abt, Jr. et al. |
| 8,543,929 B1 | 9/2013 | Holloway |
| 8,898,590 B2 | 11/2014 | Okada et al. |
| 8,954,862 B1 | 2/2015 | Mabie et al. |
| 9,201,854 B1 | 12/2015 | Kloiber et al. |
| 9,298,834 B2 | 3/2016 | Kleppner et al. |
| 9,465,434 B2 | 10/2016 | Mason |
| 9,471,192 B2 | 10/2016 | Mason |
| 9,479,548 B2 | 10/2016 | Jensen et al. |
| 9,479,549 B2 | 10/2016 | Pearson |
| 10,255,023 B2 | 4/2019 | Liu et al. |
| 10,802,783 B2 | 10/2020 | Santhakumar et al. |
| 11,262,969 B2 | 3/2022 | Santhakumar et al. |
| 11,481,730 B2 | 10/2022 | Foley et al. |
| 2003/0020671 A1 | 1/2003 | Santoro et al. |
| 2003/0058227 A1 | 3/2003 | Hara et al. |
| 2004/0060037 A1 | 3/2004 | Damm et al. |
| 2004/0083264 A1 | 4/2004 | Veselov |
| 2004/0093331 A1 | 5/2004 | Garner et al. |
| 2004/0150627 A1 | 8/2004 | Luman et al. |
| 2004/0155871 A1 | 8/2004 | Perski et al. |
| 2004/0174398 A1 | 9/2004 | Luke et al. |
| 2004/0243605 A1 | 12/2004 | Bernstein et al. |
| 2004/0243663 A1 | 12/2004 | Johanson et al. |
| 2005/0060656 A1 | 3/2005 | Martinez et al. |
| 2005/0195216 A1 | 9/2005 | Kramer et al. |
| 2005/0237380 A1 | 10/2005 | Kakii et al. |
| 2005/0262107 A1 | 11/2005 | Bergstraesser et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0195507 A1 | 8/2006 | Baek et al. |
| 2006/0211404 A1 | 9/2006 | Cromp et al. |
| 2006/0220982 A1 | 10/2006 | Ueda |
| 2006/0224427 A1 | 10/2006 | Salmon |
| 2006/0294473 A1 | 12/2006 | Keely et al. |
| 2007/0070066 A1 | 3/2007 | Bakhash |
| 2007/0136685 A1 | 6/2007 | Bhatla et al. |
| 2007/0198744 A1 | 8/2007 | Wensley et al. |
| 2007/0262964 A1 | 11/2007 | Zotov et al. |
| 2008/0114844 A1 | 5/2008 | Sanchez et al. |
| 2008/0143818 A1 | 6/2008 | Ferren et al. |
| 2008/0163053 A1 | 7/2008 | Hwang et al. |
| 2008/0177771 A1 | 7/2008 | Vaughn |
| 2008/0201339 A1 | 8/2008 | McGrew et al. |
| 2008/0207188 A1 | 8/2008 | Ahn et al. |
| 2008/0301101 A1 | 12/2008 | Baratto et al. |
| 2009/0049381 A1 | 2/2009 | Robertson et al. |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0207146 A1 | 8/2009 | Shimasaki et al. |
| 2009/0217177 A1 | 8/2009 | DeGrazia |
| 2009/0234721 A1 | 9/2009 | Bigelow et al. |
| 2009/0251457 A1 | 10/2009 | Walker et al. |
| 2009/0278806 A1 | 11/2009 | Duarte et al. |
| 2009/0282359 A1 | 11/2009 | Saul et al. |
| 2009/0309846 A1 | 12/2009 | Trachtenberg et al. |
| 2009/0309853 A1 | 12/2009 | Hildebrandt et al. |
| 2010/0011316 A1 | 1/2010 | Sar et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0192091 A1 | 7/2010 | Oishi et al. |
| 2010/0194701 A1 | 8/2010 | Hill |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1 | 12/2010 | Groth et al. |
| 2010/0309148 A1 | 12/2010 | Fleizach et al. |
| 2010/0315481 A1 | 12/2010 | Wijngaarden et al. |
| 2010/0318470 A1 | 12/2010 | Meinel et al. |
| 2010/0318921 A1 | 12/2010 | Trachtenberg et al. |
| 2010/0328306 A1 | 12/2010 | Chau et al. |
| 2011/0047505 A1 | 2/2011 | Fillion et al. |
| 2011/0050640 A1 | 3/2011 | Lundback et al. |
| 2011/0055773 A1 | 3/2011 | Agarawala et al. |
| 2011/0060992 A1 | 3/2011 | Jevons et al. |
| 2011/0063191 A1 | 3/2011 | Leung et al. |
| 2011/0069184 A1 | 3/2011 | Go |

(56) References Cited

U.S. PATENT DOCUMENTS

| | | |
|---|---|---|
| 2011/0109526 A1 | 5/2011 | Bauza et al. |
| 2011/0148926 A1 | 6/2011 | Koo et al. |
| 2011/0154192 A1 | 6/2011 | Yang et al. |
| 2011/0183654 A1 | 7/2011 | Lanier et al. |
| 2011/0191343 A1 | 8/2011 | Heaton et al. |
| 2011/0197147 A1 | 8/2011 | Fai |
| 2011/0197157 A1 | 8/2011 | Hoffman et al. |
| 2011/0197263 A1 | 8/2011 | Stinson, III |
| 2011/0202424 A1 | 8/2011 | Chun et al. |
| 2011/0208807 A1 | 8/2011 | Shaffer |
| 2011/0214063 A1 | 9/2011 | Saul |
| 2011/0216064 A1 | 9/2011 | Dahl et al. |
| 2011/0225494 A1 | 9/2011 | Shmuylovich et al. |
| 2011/0243380 A1 | 10/2011 | Forutanpour et al. |
| 2011/0246875 A1 | 10/2011 | Parker et al. |
| 2011/0264785 A1 | 10/2011 | Newman et al. |
| 2011/0271229 A1 | 11/2011 | Yu |
| 2012/0011465 A1 | 1/2012 | Rezende |
| 2012/0019452 A1 | 1/2012 | Westerman |
| 2012/0026200 A1 | 2/2012 | Okada et al. |
| 2012/0030193 A1 | 2/2012 | Richberg et al. |
| 2012/0038572 A1 | 2/2012 | Kim et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0169772 A1 | 7/2012 | Werner et al. |
| 2012/0176328 A1 | 7/2012 | Brown et al. |
| 2012/0179994 A1 | 7/2012 | Knowlton et al. |
| 2012/0229425 A1 | 9/2012 | Barrus et al. |
| 2012/0254858 A1 | 10/2012 | Moyers et al. |
| 2012/0260176 A1 | 10/2012 | Sehrer |
| 2012/0274583 A1 | 11/2012 | Haggerty |
| 2012/0275683 A1 | 11/2012 | Adler et al. |
| 2012/0278738 A1 | 11/2012 | Kruse et al. |
| 2012/0320073 A1 | 12/2012 | Mason |
| 2013/0004069 A1 | 1/2013 | Hawkins et al. |
| 2013/0027404 A1 | 1/2013 | Sarnoff |
| 2013/0047093 A1 | 2/2013 | Reuschel et al. |
| 2013/0086487 A1 | 4/2013 | Findlay et al. |
| 2013/0093695 A1 | 4/2013 | Davidson |
| 2013/0198653 A1 | 8/2013 | Tse et al. |
| 2013/0218998 A1 | 8/2013 | Fischer et al. |
| 2013/0222371 A1 | 8/2013 | Reitan |
| 2013/0246969 A1 | 9/2013 | Barton |
| 2013/0282820 A1 | 10/2013 | Jabri et al. |
| 2013/0320073 A1 | 12/2013 | Yokoo et al. |
| 2013/0346878 A1 | 12/2013 | Mason |
| 2013/0346910 A1 | 12/2013 | Mason |
| 2014/0013234 A1 | 1/2014 | Beveridge et al. |
| 2014/0022334 A1 | 1/2014 | Lockhart et al. |
| 2014/0032770 A1 | 1/2014 | Pegg |
| 2014/0033067 A1 | 1/2014 | Pittenger et al. |
| 2014/0040767 A1 | 2/2014 | Bolia |
| 2014/0055400 A1 | 2/2014 | Reuschel |
| 2014/0062957 A1 | 3/2014 | Perski et al. |
| 2014/0063174 A1 | 3/2014 | Junuzovic et al. |
| 2014/0101122 A1 | 4/2014 | Oren |
| 2014/0149880 A1 | 5/2014 | Farouki |
| 2014/0149901 A1 | 5/2014 | Hunter |
| 2014/0222916 A1 | 8/2014 | Foley et al. |
| 2014/0223334 A1 | 8/2014 | Jensen et al. |
| 2014/0223335 A1 | 8/2014 | Pearson |
| 2014/0282229 A1 | 9/2014 | Laukkanen et al. |
| 2014/0325431 A1 | 10/2014 | Vranjes et al. |
| 2014/0380193 A1 | 12/2014 | Coplen et al. |
| 2015/0007040 A1 | 1/2015 | Xu et al. |
| 2015/0007055 A1 | 1/2015 | Lemus et al. |
| 2015/0084055 A1 | 3/2015 | Nagata et al. |
| 2015/0089452 A1 | 3/2015 | Dorninger |
| 2015/0120834 A1* | 4/2015 | Maheshwari ........ G06Q 10/101 709/204 |
| 2015/0185990 A1 | 7/2015 | Thompson |
| 2015/0248384 A1 | 9/2015 | Luo et al. |
| 2015/0279071 A1 | 10/2015 | Xin |
| 2015/0331489 A1 | 11/2015 | Edwardson |
| 2016/0085381 A1 | 3/2016 | Parker et al. |
| 2016/0142471 A1 | 5/2016 | Tse et al. |
| 2016/0232647 A1 | 8/2016 | Carlos et al. |
| 2016/0328098 A1 | 11/2016 | Santhakumar et al. |
| 2016/0328114 A1 | 11/2016 | Santhakumar et al. |
| 2016/0378291 A1 | 12/2016 | Pokrzywka |
| 2017/0090852 A1 | 3/2017 | Harada |
| 2017/0235537 A1 | 8/2017 | Liu et al. |
| 2017/0315767 A1 | 11/2017 | Rao |
| 2017/0330150 A1 | 11/2017 | Foley et al. |

FOREIGN PATENT DOCUMENTS

| | | |
|---|---|---|
| CN | 103023961 A | 4/2013 |
| CN | 103229141 A | 7/2013 |
| CN | 104112440 A | 10/2014 |
| CN | 104395883 A | 3/2015 |
| CN | 104412257 A | 3/2015 |
| JP | 2002116996 A | 4/2002 |
| JP | 2005258877 A | 9/2005 |
| JP | 2010079834 A | 4/2010 |
| JP | 2010129093 A | 6/2010 |
| JP | 2010134897 A | 6/2010 |
| JP | 2010165178 A | 7/2010 |
| JP | 2010218313 A | 9/2010 |
| JP | 2012043251 A | 3/2012 |
| JP | 2016012252 A | 1/2016 |
| KR | 1020090085068 A | 8/2009 |
| WO | 0161633 A2 | 8/2001 |
| WO | 2008063833 A1 | 5/2008 |
| WO | 2009018314 A2 | 2/2009 |
| WO | 2011029067 A2 | 3/2011 |
| WO | 2011048901 A1 | 4/2011 |
| WO | 2012162411 A1 | 11/2012 |
| WO | 2014023432 A1 | 2/2014 |
| WO | 2014121209 A2 | 8/2014 |

OTHER PUBLICATIONS

CN 201480039006.8—Response to First Office Action dated Jul. 28, 2017 filed Feb. 12, 2018, 38 pages.
CN 201480039006.8—Second Office Action dated Jun. 1, 2018, 39 pages.
EP 12789695.9—Supplemental European Search Report dated Nov. 19, 2014, 9 pgs.
EP 14808241.5—Amendments made at the time of regional phase entry, dated Dec. 17, 2015, 11 pages.
EP 14808241.5—Extended European Search Report dated Nov. 18, 2016, 9 pgs.
EP 14808241.5—First Office Action dated Jan. 25, 2018, 10 pages.
EP 14808241.5—Response to European Extended Search Report dated Nov. 18, 2016 filed May 24, 2017, 19 pages.
EP 14808241.5—Response to First Office Action dated Jan. 25, 2018 filed on May 22, 2018, 15 pages.
JP 2016-518315—First Office Action dated Feb. 6, 2018, 7 pages.
JP 2016-518315—Notice of Allowance dated Sep. 18, 2018, 10 pages.
JP 2016-518315—Request for Examination and Amendment filed Feb. 23, 2017, 9 pages.
JP 2016-518315—Response to First Office Action dated Feb. 6, 2018 filed Aug. 2, 2018, 19 pages.
PCT/US2012/039176—International Search Report and Written Opinion dated Sep. 24, 2012, 15 pgs.
PCT/US2013/058030—International Search Report and Written Opinion dated Dec. 27, 2013, 11 pgs.
PCT/US2013/058040—International Search Report and Written Opinion dated Dec. 18, 2013, 10 pgs.
PCT/US2013/058261—International Search Report and Written Opinion dated Dec. 30, 2013, 14 pgs.
PCT/US2014/014475—International Search Report and Written Opinion dated Nov. 28, 2014, 10 pgs.
PCT/US2014/014489—International Search Report and Written Opinion dated May 30, 2014, 13 pgs.

(56) References Cited

OTHER PUBLICATIONS

PCT/US2014/014494—International Search Report and Written Opinion dated May 30, 2014, 10 pgs.
PCT/US2014/018375—International Preliminary Report on Patentability, dated Dec. 8, 2015, 12 pgs.
PCT/US2014/018375—International Search Report and Written Opinion dated Jul. 1, 2014, 16 pgs.
PCT/US2016/031000—International Search Report dated Aug. 16, 2016, 14 pgs.
PCT/US2017/017432—International Search Report and Written Opinion dated May 31, 2017, 14 pages.
U.S. Appl. No. 13/758,993—Line Drawing Behavior for Digital Whiteboard filed Feb. 4, 2013, 46 pgs.
U.S. Appl. No. 13/759,017—Office Action dated Nov. 6, 2014, 19 pgs.
U.S. Appl. No. 13/759,018—Office Action dated Oct. 22, 2014, 16 pgs.
U.S. Appl. No. 13/759,018—Office Action dated Apr. 23, 2015, 24 pgs.
U.S. Appl. No. 14/090,830—Appeal Brief filed Dec. 6, 2017, 29 pgs.
U.S. Appl. No. 14/090,830—Examiner's 2nd Answer to Appeal Brief dated Mar. 28, 2018, 23 pgs.
U.S. Appl. No. 14/090,830—Examiner's Answer to Appeal Brief dated Mar. 19, 2018, 23 pgs.
U.S. Appl. No. 14/090,830—Office Action dated Dec. 3, 2015, 26 pgs.
U.S. Appl. No. 14/090,830—Office Action dated May 5, 2016, 39 pgs.
U.S. Appl. No. 14/090,830—Reply Brief dated Apr. 17, 2018, 7 pgs.
U.S. Appl. No. 14/090,830—Supplemental Appeal Brief filed Jan. 5, 2018, 7 pgs.
U.S. Appl. No. 15/147,224—Office Action dated Feb. 7, 2018, 16 pgs.
U.S. Appl. No. 15/147,576—Office Action dated Oct. 5, 2018, 22 pages.
U.S. Appl. No. 15/340,810—Office Action dated Jun. 18, 2018, 20 pgs.
U.S. Appl. No. 15/340,810 Notice of Allowance, dated Nov. 28, 2018, 18 pages.
U.S. Appl. No. 15/340,810 Response to Office Action dated Jun. 18, 2018, filed Oct. 15, 2018, 18 pgs.
AU 2014275495—First Examination Report dated Mar. 25, 2019, 3 pages.
EP 16790089-3—EP Extended Search Report dated Jan. 2, 2019, 10 pages.
PCT/US2017/017432—International Preliminary Report on Patentability and Written Opinion, dated Aug. 14, 2018, 10 pages.
U.S. Appl. No. 15/147,224—Final Office Action, dated Dec. 13, 2018, 13 pages.
U.S. Appl. No. 15/668,009—Office Action dated Dec. 26, 2019, 18 pages.
KR 10-2016-7000174—Request for Examination and Voluntary Amendment, 31 pages, dated Feb. 25, 2019.
U.S. Appl. No. 15/147,576—Notice of Allowance dated Jan. 8, 2020, 23 pages.
AU 2014275495—Response to First Examination Report dated Mar. 25, 2019 filed Jan. 29, 2020, 131 pages.
U.S. Appl. No. 16/375,487—Preliminary Amendment filed Nov. 6, 2019, 11 pages.
U.S. Appl. No. 15/791,351—Office Action dated Dec. 17, 2019, 63 pages.
U.S. Appl. No. 16/375,487—Notice of Allowance dated Mar. 6, 2020, 38 pages.
U.S. Appl. No. 15/791,351—Response to Office Action dated Dec. 17, 2019 filed Mar. 17, 2020, 22 pages.
U.S. Appl. No. 15/668,009—Office Action dated Jun. 18, 2020, 28 pages.
U.S. Appl. No. 15/668,009—Response to Office Action dated Dec. 26, 2019 filed Apr. 17, 2020, 30 pages.
U.S. Appl. No. 15/791,351—Final Office Action dated Apr. 30, 2020, 74 pages.
U.S. Appl. No. 15/147,576—Notice of Allowance dated Apr. 22, 2020, 10 pages.
U.S. Appl. No. 16/375,487—Notice of Allowance dated Apr. 27, 2020, 13 pages.
PCT/US2016/033134 International Search Report, dated Aug. 8, 2016, 3 pages.
PCT/US2018/028365—International Search Report and Written Opinion dated Jul. 31, 2018, 13 pages.
U.S. Appl. No. 15/496,472—Non-Final Office Action dated Dec. 31, 2018, 46 pages.
CA 2914371—First Office Action dated Mar. 11, 2020, 4 pages.
EP 14808241.5—Summons to Attend Oral Proceedings dated Feb. 18, 2020, 12 pages.
AU 2014275495—Notice of Acceptance dated Feb. 20, 2020, 6 pages.
JP 2017-557318—Amendment filed with JP translation on Dec. 17, 2017, 13 pages.
EP 16790089-3—Response to European Extended Search Report dated Jan. 2, 2019, as filed Jul. 5, 2019, 27 pages.
EP 16790089-3—Rule 71(3) EPC Communication (Intention to Grant) dated Jan. 22, 2020, 100 pages.
U.S. Appl. No. 15/147,576—Office Action dated Aug. 8, 2019, 22 pages.
U.S. Appl. No. 15/147,224—Office Action dated Feb. 7, 2018, 30 pages.
U.S. Appl. No. 17/027,571—Office Action dated Apr. 28, 2021, 50 pages.
U.S. Appl. No. 17/027,571—Response to Office Action dated Apr. 28, 2021, filed Aug. 30, 2021, 14 pages.
U.S. Appl. No. 15/668,009 Response to Office Action dated Jun. 18, 2020, filed Nov. 10, 2020, 18 pages.
U.S. Appl. No. 14/090,830 Non-Final Office Action dated Dec. 30, 2016, 53 pgs.
U.S. Appl. No. 14/090,830 Response to Non-Final Office Action dated Dec. 30, 2016, filed Mar. 27, 2017, 32 pgs.
U.S. Appl. No. 14/090,830 Final Office Action, dated Jun. 16, 2017, 45 pgs.
PCT/US2014/018375 International Search Report and Written Opinion, dated Jul. 1, 2014, 16 pages.
CA 2914371—Response to First Office Action filed Jul. 10, 2020, 13 pages.
CA 2914371—Second Office Action dated Jan. 22, 2021, 4 pages.
EP 14808241.5—Intent to grant Rule 71(3) communication, dated Oct. 5, 2020, 84 pages.
KR 10-2016-7000174—First Office Action dated Sep. 1, 2020, 12 pages.
KR10-2016-7000174 Voluntary Amendments, dated Feb. 25, 2019, 28 pages.
KR 10-2016-7000174 Repsonse to First Office Action, dated Sep. 1, 2020, 29 pages.
PCT/US2016/031000 International Preliminary Report on Patentability, dated Nov. 16, 2017, 13 pages.
CN 201680026389.4—First Office Action dated Sep. 23, 2020, 22 pages.
CN 201680026389.4—Response to First Office Action filed Jan. 7, 2021, 19 pages with English translation.
U.S. Appl. No. 15/791,351—Non-Final Office Action dated Oct. 1, 2020, 71 pages.
KR 10-2016-7000714—Second Office Action dated Apr. 27, 2021, 45 pages (translation included).
U.S. Appl. No. 15/791,351—Response to Final Office Action dated Apr. 30, 2020, filed Aug. 26, 2020, 21 pages.
U.S. Appl. No. 15/791,351—Response to Non-Final Office Action dated Oct. 1, 2020, filed 28 pages.
U.S. Appl. No. 15/791,351—Supplemental Response to Non-Final Office Action dated Oct. 1, 2020, filed May 3, 2021, 14 pages.
U.S. Appl. No. 17/027,571—Notice of Allowance dated Oct. 22, 2021, 10 pages.
CN 2016800263894 Notice of Grant, dated Mar. 2, 2021, 2 pages.
U.S. Appl. No. 14/090,830 Notice of Allowance, dated Dec. 26, 2018, 17 pages.

(56) References Cited

OTHER PUBLICATIONS

U.S. Appl. No. 15/668,009 Notice of Allowance, dated Dec. 14, 2020, 17 pages.
U.S. Appl. No. 15/791,351 Notice of Allowance, dated May 13, 2021, 10 pages.
CA 2914371 Response to Second Office Action dated Jan. 22, 2021, filed Jul. 21, 2021, 10 pages.
U.S. Appl. No. 13/759,017—Notice of Allowance, dated Jun. 9, 2016, 26 pages.
U.S. Appl. No. 17/201,574—Office Action dated Mar. 3, 2022, 19 pages.
CA 2914371—Third Office Action dated Feb. 18, 2022, 7 pages.
Buszko et al., Decentralized Ad-Hoc Groupware API and Framework for Mobile Collaboration, Proceedings of the 2001 International ACM SIGGROUP Conference on Supporting Group Work, Association for Computing Machinery, dated Sep. 30-Oct. 3, 2001, 10 pages.
Albin, T., "Comfortable Portable Computing: The Ergonomic Equation," Copyright 2008 Ergotron, Inc., 19 pgs.
Anacore, "Anacore Presents Synthesis", InfoComm 2012: Las Vegas, NV, USA, Jun. 9-15, 2012, 2 pages, screen shots taken from http://www.youtube.com/watch?v=FbQ9P1c5aNk (visited Nov. 1, 2013).
Ionescu, Ama, et al., "WorkspaceNavigator: Tools for Capture, Recall and Reuse using Spatial Cues in an Interactive Workspace," 2002, <URL=https://hci.stanford.edu/research/wkspcNavTR.pdf>, 16 p.
Johanson, Brad et al., "The Event Heap: an Enabling Infrastructure for Interactive Workspaces." 2000 <Url=https://iraphics.stanford.edu/papers/eheap/>, 11 pages.
Keller, Ariane, "The ANA Project, Development of the ANA-Core Software" Masters Thesis, dated Sep. 21, 2007, ETH Zurich, 92 pages.
Screen captures from YouTube video clip entitled "Enable Drag-and-Drop Between TreeView," 7 pages, uploaded on Oct. 27, 2010 by user "Intersoft Solutions". Retrieved from Internet: <https :I/www.youtube.com/watch?v=guoj1AnKu_s>.
Taylor, Allen G, SQL for Dummies, 7th Edition, published Jul. 5, 2012, 11 pages.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.
W3C Working Group Note, HTML: The Markup Language (an HTML language reference), http://www.w3.org/TR/html-markup/iframe.html[Aug. 4, 2016 2:01:59 PM], 3 pages.
"Ergonomics Data and Mountain Heights," Ergonomic Ground Rules, last revised Sep. 22, 2010, 2 pgs.
KR 10-2016-7000174—Second Office Action dated Apr. 27, 2021, 45 pages.
U.S. Appl. No. 13/758,993, filed Feb. 4, 2013, entitled "Line Drawing Behavior for Digital Whiteboard," Inventor Steve Mason, 29 pgs.
U.S. Appl. No. 13/759,018, filed Feb. 4, 2013, entitled "Collaboration System with Whiteboard with Federated Display," Inventor Adam Pearson, 48 pgs.
Search Report and Written Opinion PCT/US2013/058261—dated Dec. 30, 2013, 14 pgs.
Office Action dated Oct. 7, 2014, U.S. Appl. No. 13/758,989—8 pgs.
Search Report and Written Opinion PCT/US2014/014475—dated Nov. 28, 2014, 10 pgs.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2012.
U.S. Appl. No. 14/018,370—Office Action dated May 21, 2015, 51 pages.
Office Action dated Jul. 8, 2015, U.S. Appl. No. 13/478,994—12 pgs.
Office Action dated Sep. 29, 2014, U.S. Appl. No. 13/478,994—Office Action dated Sep. 29, 2014, 10 pgs.
Office Action dated Dec. 9, 2013, U.S. Appl. No. 13/478,994—7 pgs.
"Ergonomics Data and Mounting Heights," Ergonomic Ground Rules, last revised Sep. 22, 2010, 2 pgs.
Office Action dated Jul. 30, 2015, U.S. Appl. No. 13/758,993—43 pgs.
U.S. Appl. No. 13/759,018—Office Action dated Aug. 27, 2015, 22 pgs.
U.S. Appl. No. 13/758,984—Office Action dated Feb. 13, 2015, 22 pgs.
U.S. Appl. No. 13/759,019—Office Action dated Feb. 5, 2016, 26 pgs.

\* cited by examiner

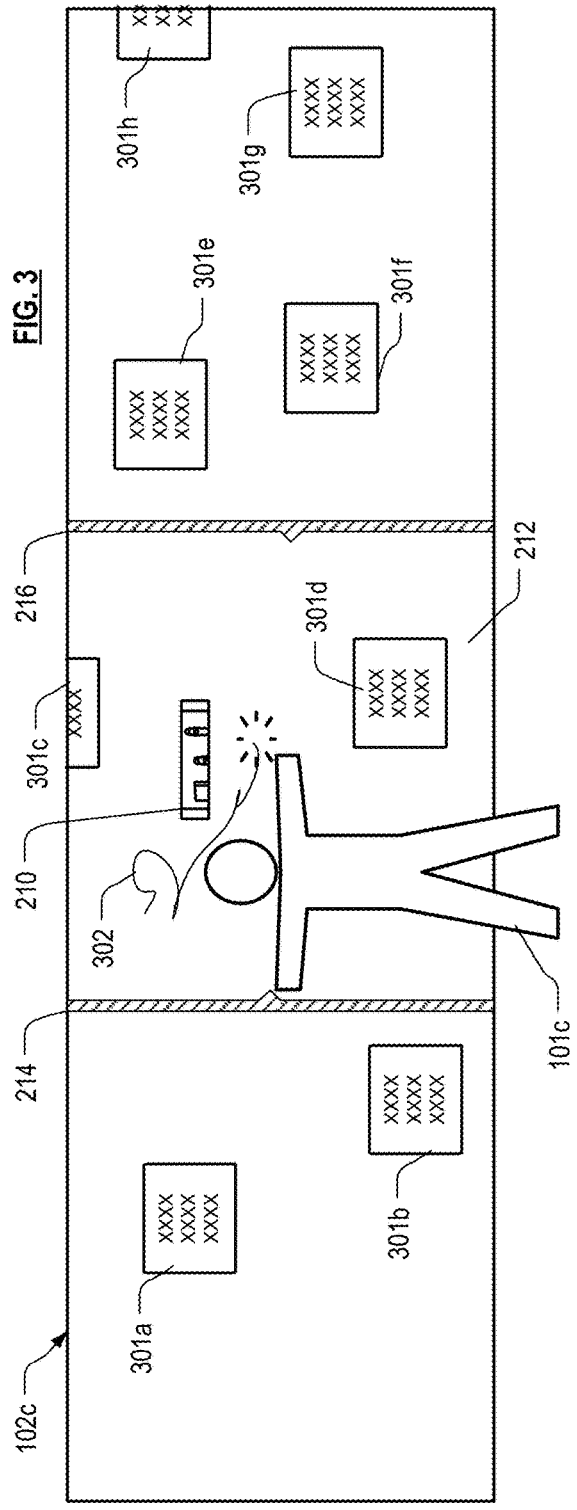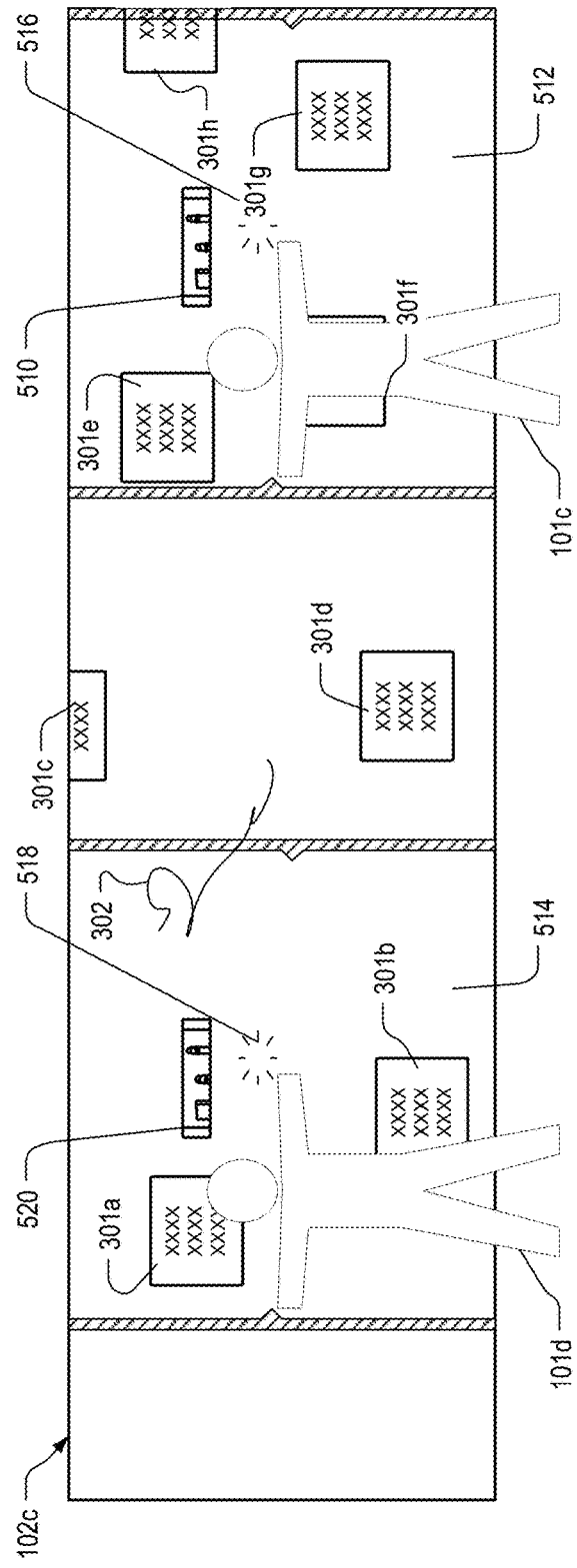

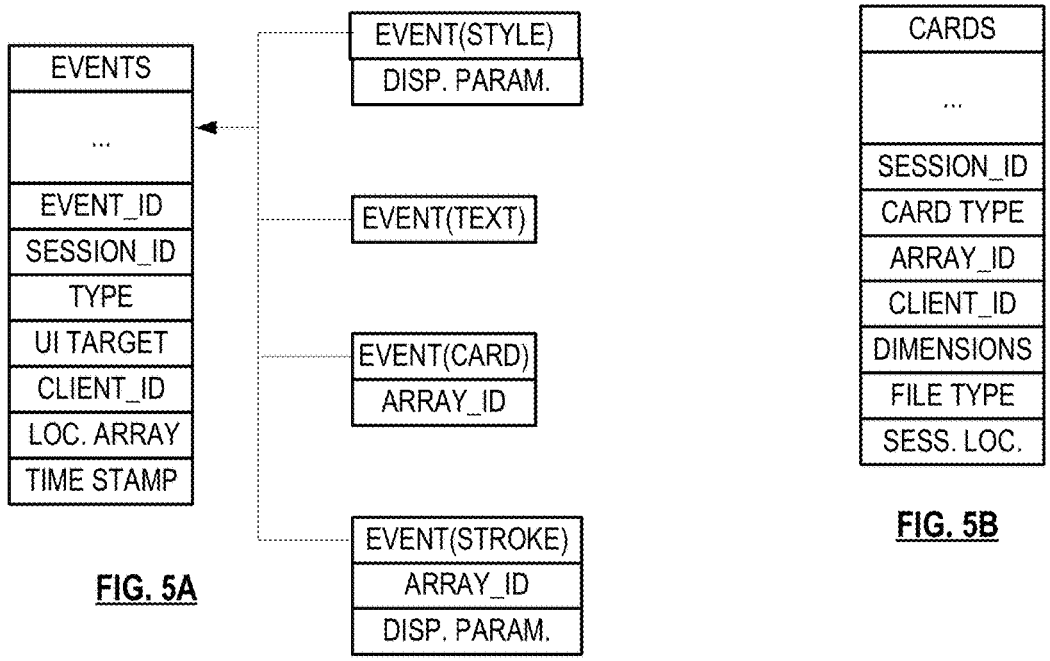
FIG. 5A
FIG. 5B
FIG. 5C
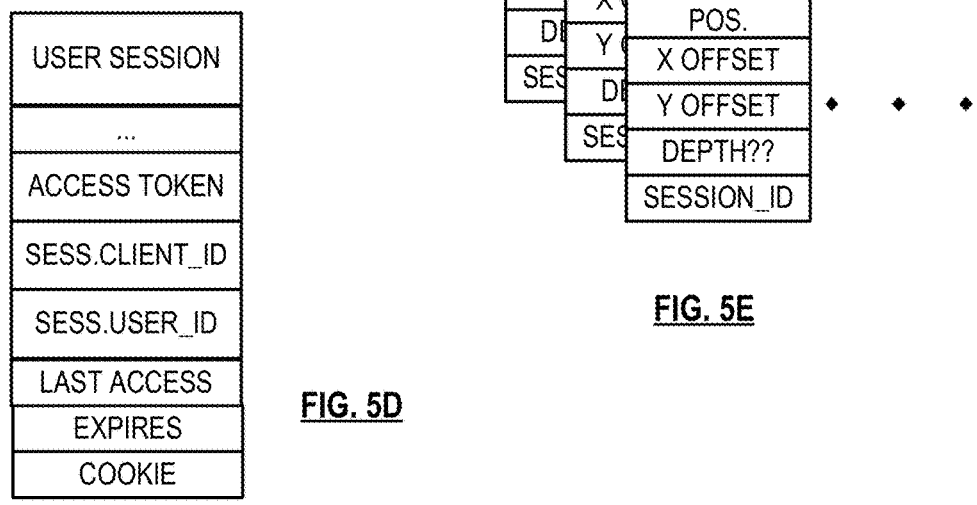
FIG. 5D
FIG. 5E

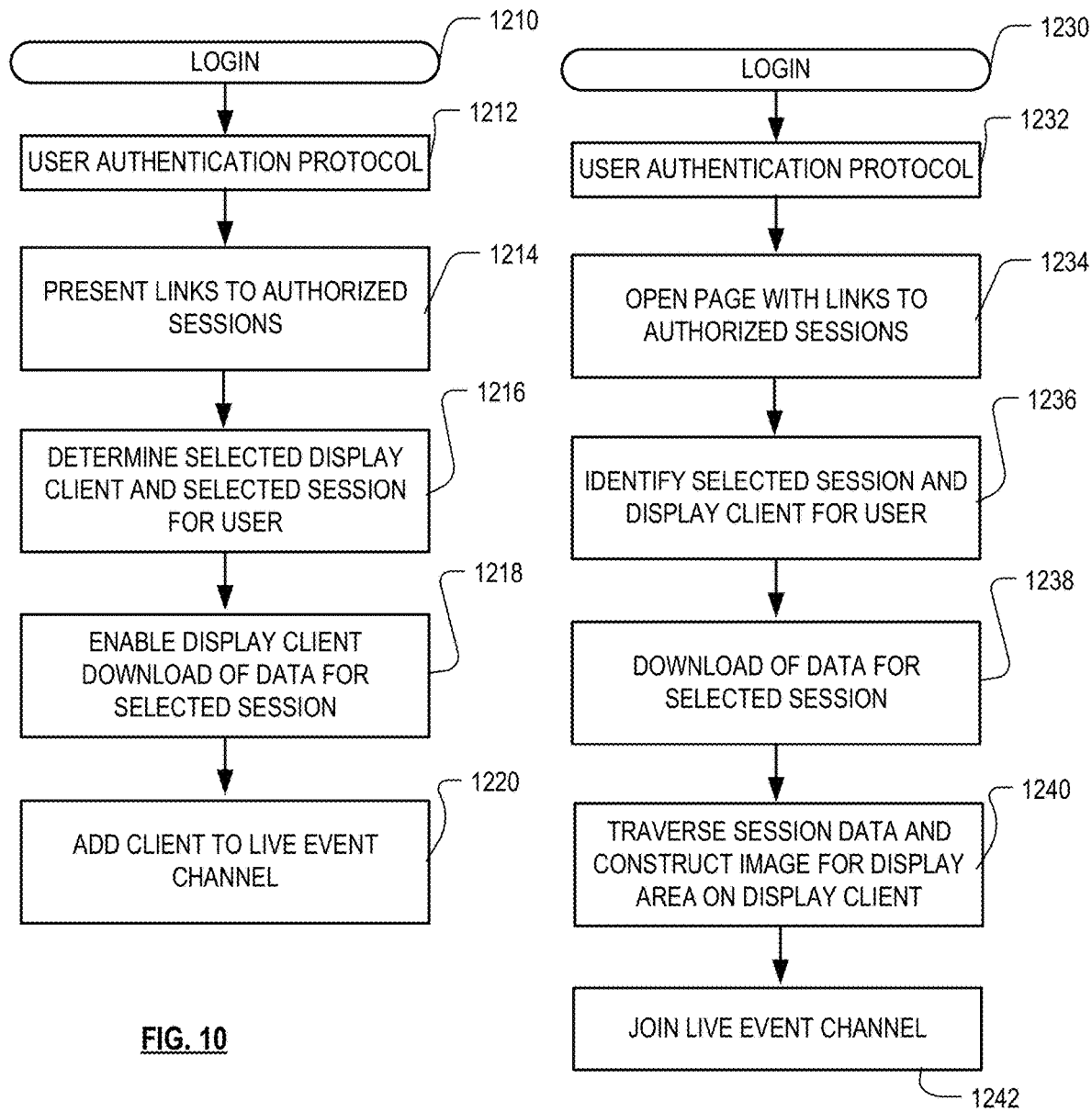

COLLABORATION SYSTEM INCLUDING A SPATIAL EVENT MAP

CROSS-REFERENCE TO OTHER APPLICATIONS

The present application is a continuation of U.S. patent application Ser. No. 17/201,574, titled "COLLABORATION SYSTEM INCLUDING A SPATIAL EVENT MAP", filed 15 Mar. 2021, which is a continuation of U.S. patent application Ser. No. 15/668,009, titled "COLLABORATION SYSTEM INCLUDING A SPATIAL EVENT MAP", filed 3 Aug. 2017, now U.S. Pat. No. 10,949,806, issued 16 Mar. 2021, which is a continuation of U.S. patent application Ser. No. 14/090,830, titled "COLLABORATION SYSTEM INCLUDING A SPATIAL EVENT MAP", filed 26 Nov. 2013, now U.S. Pat. No. 10,304,037, issued 28 May 2019, which claims the benefit of U.S. Provisional Application for Patent No. 61/832,106, filed 6 Jun. 2013; and is a continuation-in-part of U.S. application Ser. No. 13/759,017, filed 4 Feb. 2013, entitled "COLLABORATION SYSTEM WITH WHITEBOARD ACCESS TO GLOBAL COLLABORATION DATA", now U.S. Pat. No. 9,479,548, issued 25 Oct. 2016.

BACKGROUND

The invention relates to apparatuses, methods, and systems for digital collaboration, and more particularly to digital display systems which facilitate multiple simultaneous users having access to global workspace data.

Digital displays are often used for interactive presentations and other purposes in a manner analogous to whiteboards. Some displays are networked and can be used for collaboration, so that modifications made to the display image on one display are replicated on another display. Large scale displays offer the opportunity for more than one user to present or annotate simultaneously on the same surface. However, problems can occur in the coordination of the multiple users, and in some circumstances their use of a single display can restrict their flexibility of expression.

Also, digital displays can comprise large display screens or arrays of screens in a single room, which are configured to provide a large interaction surface. Thus, it is anticipated that the large digital displays may be shared by many users at different times for different collaborations. Where the workspace data for collaboration is confidential with access limited to authorized users, but the digital displays at which the users interact are distributed to many sites and not necessarily under exclusive control of a single user, a problem arises with the security of access to a collaboration.

In addition, the distributed nature of the system leads to the possibility of multiple users in different places who interact with, and can change, the same workspace data at the same time, and at times when no other user is observing the workspace data. This creates a problem with concurrency in the multiple locations, and with sharing information about a current state of the workspace data.

Therefore, it would be desirable to find ways to allow multiple users to share workspace data in a distributed network of displays, in such a way that each user has maximum freedom to express his or her ideas with real time exchange of ideas, while providing security adequate to protect the confidential nature of the collaboration. An opportunity therefore arises to create robust solutions to the problem. Better ideas, collaboration and results may be achieved.

SUMMARY

A collaboration system that implements a spatial event map is described that can have many distributed digital displays which are used to display images based on the spatial event map. A spatial event maps can also be deployed in systems having a single display in a single location.

A system that supports an essentially unlimited amount of 2D and 3D working space for each session that is accessible across multiple devices and locations is disclosed.

A collaboration system is described based on a spatial event map, which includes entries that locate events in a workspace. The spatial event map can include a log of events, where entries in the log have location of the graphical target of the event in the workspace and a time. Also, entries in the log can include a parameter (e.g. url or actual file) identifying graphical constructs used to render the graphical target on a display. Server-side network nodes and client-side network nodes are described which interact to form a collaboration system by which the spatial event map can be made accessible to authorized clients, and clients can utilize the spatial event map to render local display areas, and create events that can be added to the spatial event map and shared with other clients.

The workspace associated with a specific collaboration session can be represented as an unbounded virtual area providing a frame of reference without a specified boundary, within which to locate events in time and in virtual collaboration space. The workspace can encompass a virtual area that is practically unlimited in that it has a size large enough that the likelihood of a client-side network node navigating beyond its boundaries is negligible. For example, a size encompassing a virtual area that maps to a physical display space including 1,000,000 pixels by 1,000,000 pixels can be considered practically unlimited in some settings. In some examples, the workspace is essentially "infinite" in that its size is only limited by the extent of the addressing scheme used to identify locations within the virtual space. Also, the system can include a number of workspaces, where each workspace can be configured individually for access by a single user or by an user group.

The collaboration system can be configured according to an application program interface API so that the server-side network nodes and the client-side network nodes can communicate about collaboration events. Messages can be defined that identify events that create or modify a graphical target having a location in the workspace and the time. The events can be classified as history events and as ephemeral events, where history events are stored in the spatial event map, and ephemeral events are not permanently stored with the spatial event map but distributed among other clients of the collaboration session.

An application program interface (API), including a set of operations and parameters for the operations, is provided which provides for participation in a workspace utilizing a spatial event map. The set of operations can be implemented in data processors using software-implemented functions, which can be hardware-assisted, configured to use the parameters and perform the operations of the API.

The above summary is provided in order to provide a basic understanding of some aspects of the collaboration system described herein. This summary is not intended to identify key or critical elements of invention or to delineate a scope of invention.

BRIEF DESCRIPTION OF THE DRAWINGS

The invention will be described with respect to specific embodiments thereof, and reference will be made to the drawings, which are not drawn to scale, and in which:

FIGS. 3 and 4 illustrate aspects of drawing region behavior on the display of FIG. 1.

FIGS. 5A-5E (collectively FIG. 5) is a simplified diagram of data structures for parts of the workspace data for a workspace.

FIG. 10 is a flowchart illustrating aspects of server-side logic of a user login sequence that can be used for a collaboration system.

FIG. 11 is a flowchart illustrating aspects of client-side logic of a user login sequence that can be used for a collaboration system.

DETAILED DESCRIPTION

Figure 1A:
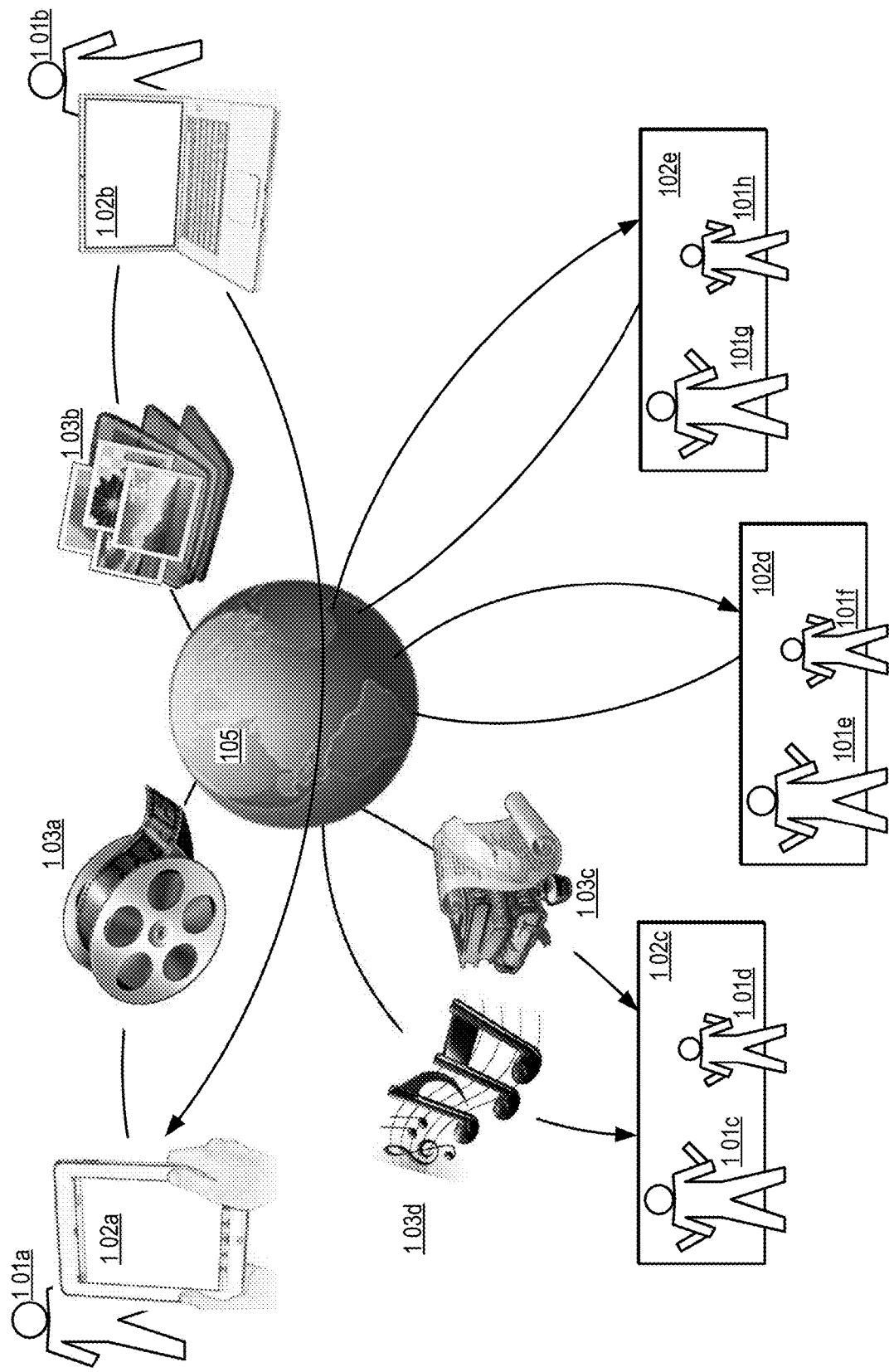
FIGS. 1A and 1B (collectively FIG. 1) illustrate example aspects of a digital display collaboration environment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The "unlimited workspace" problem includes the need to track how people and devices interact with the workspace over time. In order to solve this core problem, we have created what we call a Spatial Event Map. The Spatial Event Map contains information needed to define objects and events in a workspace. It is useful to consider the technology from the point of view of space, events, maps of events in the space, and access to the space by multiple users, including multiple simultaneous users.

Space: In order to support an unlimited amount of spatial information for a given collaboration session, we provide a way to organize a virtual space termed the workspace, which can for example be characterized by a 2-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when it is needed.

Events: Interactions with the workspace are handled as events. People, via tangible user interface devices, and systems can interact with the workspace. Events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

There can be several different kinds of events in the system. Events can be classified as persistent events, also referred to as history events, that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Map: A map of events in the workspace can include the sum total of discrete spatial events. When the persistent spatial events for a workspace are available, then that workspace can be "mapped" to a display or screen that has a displayable area of specific size, and that identifies a location or area in the workspace to be displayed in the displayable area.

Multi-User Access: One key characteristic is that all users, or multiple users, who are working on a workspace simultaneously, should be able to see the interactions of the other users in near-real-time way. The spatial event map allows users having displays at different physical locations to experience near-real-time events, including both persistent and ephemeral events, within their respective displayable areas, for all users on any given workspace.

FIG. 1A illustrates example aspects of a digital display collaboration environment. In the example, a plurality of users 101a-h (collectively 101), may desire to collaborate with each other in the creation of complex images, music, video, documents, and/or other media, all generally designated in FIG. 1A as 103a-d (collectively 103). The users in the illustrated example use a variety of devices configured as electronic network nodes, in order to collaborate with each other, for example a tablet 102a, a personal computer (PC) 102b, and many a large format displays 102c, 102d, 102e (collectively devices 102). In the illustrated example the large format display 102c, which is sometimes referred to herein as a "wall", accommodates more than one of the users, (e.g. users 101c and 101d, users 101e and 101f, and users 101g and 101h). The user devices, which are referred to as client-side network nodes, have displays on which a displayable area is allocated for displaying events in a workspace. The displayable area for a given user may comprise the entire screen of the display, a subset of the screen, a window to be displayed on the screen and so on, such that each has a limited area or extent compared to the virtually unlimited extent of the workspace.

Figure 1B:
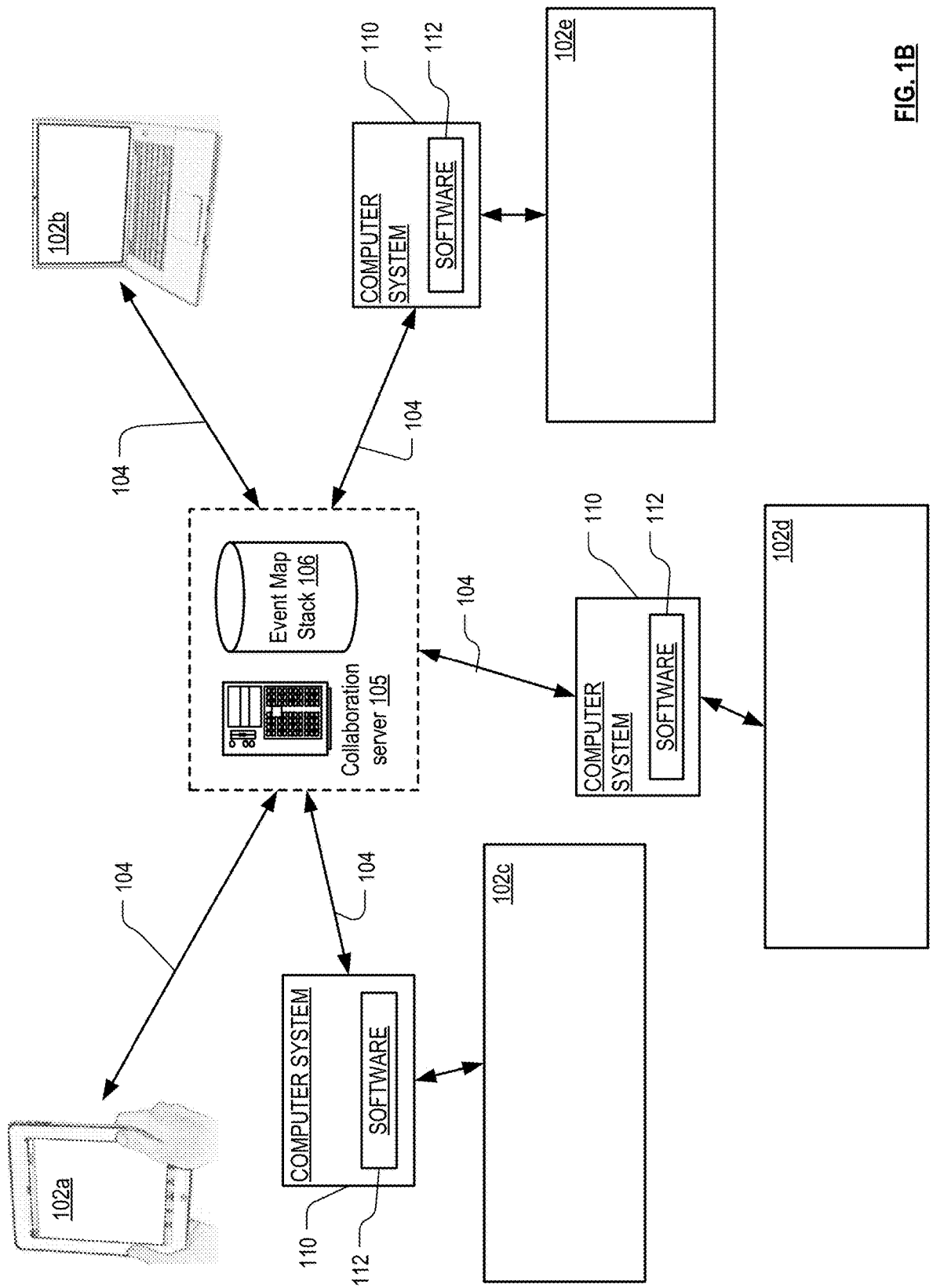

FIG. 1B illustrates the same environment as FIG. 1A. As shown in FIG. 1B, the large format displays 102c, 102d, 102e sometimes referred to herein as "walls," are controlled by respective client-side, physical network nodes 10, which in turn are in network communication with a central collaboration server 105 configured as a server-side physical network node, which has accessible thereto a database 106 storing a spatial event stack for one or more workspaces. As used herein, a physical network node is an active electronic device that is attached to a network, and is capable of sending, receiving, or forwarding information over a communications channel. Examples of electronic devices which can be deployed as network nodes, include all varieties of computers, work stations, laptop computers, hand held computers and smart phones. As used herein, the term "database" does not necessarily imply any unity of structure. For example, two or more separate databases, when considered together, still constitute a "database" as that term is used herein.

The application running at the collaboration server 105 can be hosted using Web server software such as Apache or nginx. It can be hosted for example on virtual machines running operating systems such as LINUX. The server 105 is heuristically illustrated in FIG. 1B as a single computer. However, the server architecture can involve systems of many computers, each running server applications, as is typical for large-scale cloud-based services. The server architecture includes a communication module which can be configured for various types of communication channels, including more than one channel for each client in a collaboration session. For example, near-real-time updates across the network, client software can communicate with the server communication module via using a message-based channel, based for example on the Web Socket protocol. For file uploads as well as receiving initial large volume workspace data, the client software can communicate with the server communication module via HTTP. The server can run a front-end program written for example in JavaScript served by Ruby-on-Rails, support authentication/authorization based for example on Oauth, and support coordination among multiple distributed clients. The server communication module can include a message based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The database 106 stores, for example, a digital representation of workspace data sets for a spatial event map of each session where the workspace data set can include or identify events related to objects displayable on a display canvas. A workspace data set can be implemented in the form of a spatial event stack, managed so that at least persistent spatial events are added to the stack (push) and removed from the stack (pop) in a first-in-last-out pattern during an undo operation. There can be workspace data sets for many different workspaces. A data set for a given workspace can be configured in a database, or as machine readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 102 displays only a portion of the overall workspace. A display wall has a display area for displaying objects, the display area being mapped to a corresponding area in the workspace that corresponds to a region in the workspace centered on, or otherwise located with, a user location in the workspace. The mapping of the display area to a corresponding area in the workspace is usable by the display client to identify objects in the workspace data within the display area to be rendered on the display, and to identify objects to which to link user touch inputs at positions in the display area on the display.

The server 105 and database 106 can constitute a server-side network node, including memory storing a log of events relating to graphical targets having locations in a workspace, entries in the log including a location in the workspace of the graphical target of the event, a time of the event, and a target identifier of the graphical target of the event. The server can include logic to establish links to a plurality of active client-side network nodes, to receive messages identifying events relating to modification and creation of graphical targets having locations in the workspace, to add events to the log in response to said messages, and to distribute messages relating to events identified in messages received from a particular client-side network node to other active client-side network nodes.

The logic in the server 105 can comprise an application program interface, including a specified set of procedures and parameters, by which to send messages carrying portions of the log to client-side network nodes, and to receive messages from client-side network nodes carrying data identifying events relating to graphical targets having locations in the workspace.

Also the logic in the server 105 can include an application interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 105 can store workspace data sets for a plurality of workspaces, and provide the workspace data to the display clients participating in the session. The workspace data is then used by the computer systems 110 with appropriate software 112 including display client software, to determine images to display on the display, and to assign objects for interaction to locations on the display surface. The server 105 can store and maintain a multitude of workspaces, for different collaboration sessions. Each workspace can be associated with a group of users, and configured for access only by authorized users in the group.

In some alternatives, the server 105 can keep track of a "viewport" for each device 102, indicating the portion of the canvas viewable on that device, and can provide to each device 102 data needed to render the viewport.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 106 includes various types of objects including graphical constructs, such as image bitmaps, video objects, multi-page documents, scalable vector graphics, and the like. The devices 102 are each in communication with the collaboration server 105 via a network 104. The network 104 can include all forms of networking components, such as LANs, WANs, routers, switches, WiFi components, cellular components, wired and optical components, and the internet. In one scenario two or more of the users 101 are located in the same room, and their devices 102 communicate via WiFi with the collaboration server 105. In another scenario two or more of the users 101 are separated from each other by thousands of miles and their devices 102 communicate with the collaboration server 105 via the internet. The walls 102c, 102d, 102e can be multi-touch devices which not only display images, but also can sense user gestures provided by touching the display surfaces with either a stylus or a part of the body such as one or more fingers. In some embodiments, a wall (e.g. 102c) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by Multi-Touch Ltd, Helsinki, Finland, tiled both vertically and horizontally. In order to provide a variety of expressive means, the wall 102c is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area totaling on the order of 6 feet in height and 30 feet in width, which is wide enough for multiple users to stand at different parts of the wall and manipulate it simultaneously. Flexibility of expression on the wall may be restricted in a multi-user scenario, however, since the wall does not in this embodiment distinguish between fingers of different users, or styli operated by different users. Thus if one user places the wall into one desired state, then a second user would be restricted to use that same state because the wall does not have a way to recognize that the second user's input is to be treated differently.

In order to avoid this restriction, the client-side network node can define "drawing regions" on the wall 102c. A drawing region, as used herein, is a region within which at least one aspect of the wall's state can be changed independently of other regions on the wall. In the present embodiment, the aspects of state that can differ among drawing regions include the properties of a line drawn on the wall using a stylus. Other aspects of state, such as the response of the system to finger touch behaviors may not be affected by drawing regions.

Figure 2:
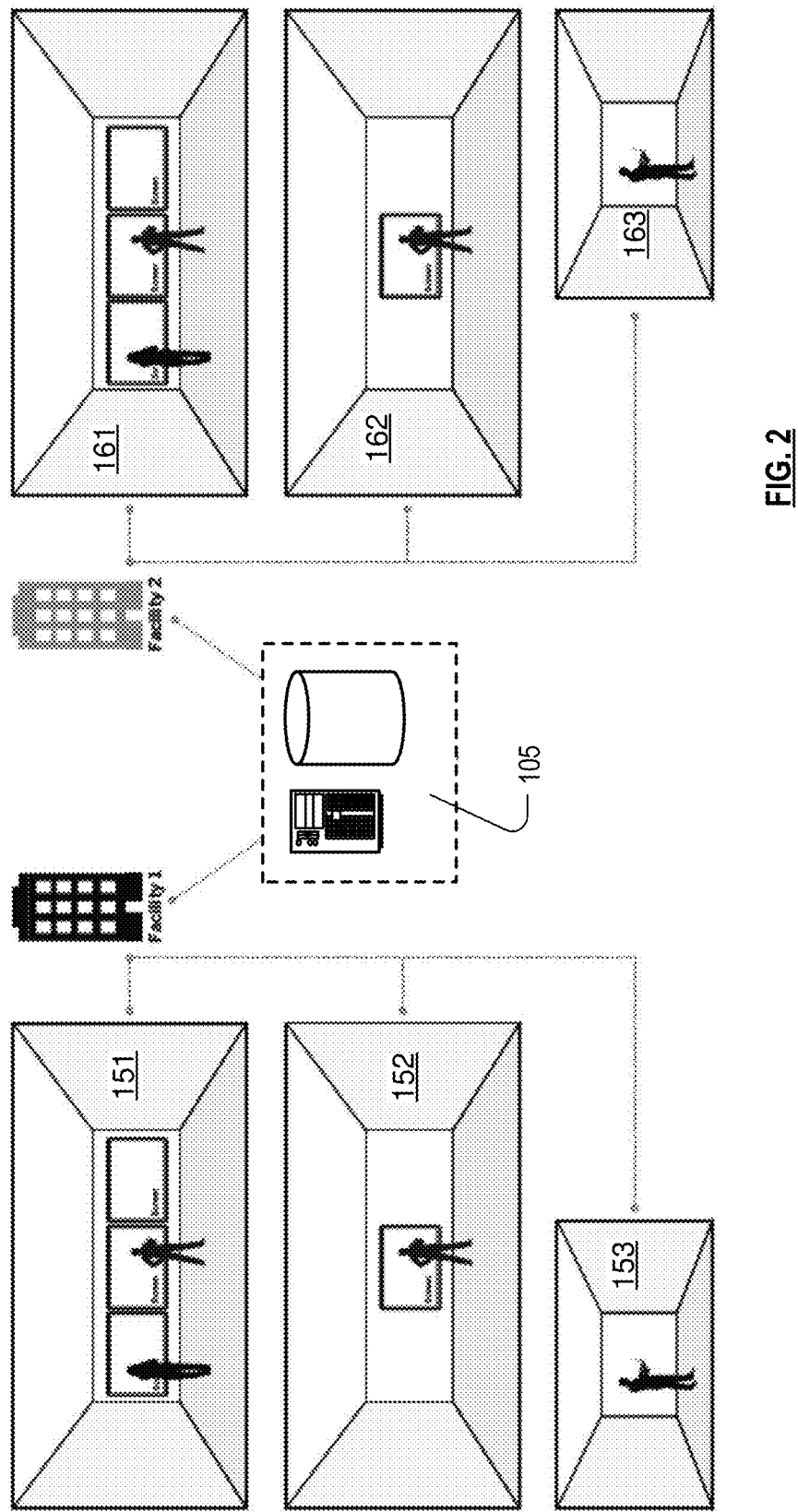
FIG. 2 illustrates a collaboration system including a plurality of display walls geographically distributed, to which workspace data can be delivered for use by authorized users.

FIG. 2 illustrates a distributed collaboration system, which includes a shared server 105 which can be linked to a number of facilities (e.g. facility 1 and facility 2) which are geographically distributed, and at which display clients are located. For example Facility 1 may be located in New York City, while Facility 2 may be located in Los Angeles. There may be many other physical locations at which display clients usable in a collaboration system are located. In this example, Facility 1 includes a first room 151, a second room 152 and a third room 153. Facility 2 includes a first room 161, a second room 162, and a third room 163. The first room 151 in Facility 1 includes a large-format display that is implemented using a plurality of displays. The second room 152 in Facility 1 includes a single screen, intermediate format display. The third room 153 in Facility 1 may be a private office or other room in which the personal computer or laptop can be utilized as the display client for a session interacting in a chosen workspace. Facility 2 in this illustration is like facility 1, and includes a first room 161, a second room 162 and a third room 163. The first room 161 in Facility 2 includes a large-format display that is implemented using a plurality of displays. The second room 162 in Facility 2 includes a single screen, intermediate format display. The third room 163 in Facility 2 may be a private office or other room in which the personal computer, laptop, mobile pad, or mobile phone can be utilized as the display client for a session.

FIG. 2 illustrates a problem that arises in connection with distributed collaboration systems which rely on large-format or intermediate format displays (or walls) that are located remotely. The large-format and intermediate format displays are not typically under exclusive control of an individual user. The collaboration server 105 therefore may have no information about the people having access to the displays at any given time.

FIG. 3 illustrates a wall 102c. The wall in this example is 6 feet tall and 30 feet wide. It is initially a default background color or image, and has a default drawing state throughout the wall. Also, workspace data can define a plurality of objects 301a to 301h, collectively objects 301, having locations in the workspace that are mapped to physical locations in the display area of the wall. The objects 301 can comprise cards that include text, images or drawing for example, which are rendered in the display area. Also, the objects 301 can include features allowing a user to interact with the content of the card, or functions that are linked to the card using user interface tools at the display, such as the touch screen. Also as illustrated in FIG. 3, a drawing overlay object 302 can be displayed in the display area of the wall.

The drawing state can be a feature of a region independent of objects 301, 302 displayed in the region, and is defined by the line drawing properties, which in the embodiment of FIG. 3 include line appearance properties such as brush type, brush size and color. For the purposes of example, the system can be configured so that when a user 101*c* touches the wall, using either a stylus or one or more fingers (sometimes referred to collectively herein as a writing implement), a toolbar 210 appears nearby and a drawing region 212 is defined. Touching a touch point is one embodiment of what is sometimes referred to herein as "opening user input"; other embodiments will be apparent to the reader. The initial drawing state of a newly defined drawing region is a predefined default (such as brush type=ink, thickness=5 mm, color=white), which in various embodiments may or may not match the default state of the remainder of the wall. In the embodiment of FIG. 2 the drawing properties established for a drawing region apply throughout the drawing region. Line drawing operates on the wall logically in a layer above any application program that might be running on the computer system 110, regardless of whether the program has ownership of any particular area of the wall 102*c*.

In the embodiment of FIG. 3 drawing regions always fill the entire vertical extent of the wall, though in other embodiments regions can be shorter, and/or have non-rectangular shapes. Also in the embodiment of FIG. 3 drawing regions are perceptibly demarcated with left and right hand borders 214 and 216; in another embodiment other means may be used to demarcate the region, such as background shading. In yet another embodiment the region boundaries are not perceptible to the user. Assuming sufficient space to the left and right, the client-side computer system 110 can spawn the drawing region in a position that is centered about the user's touch point. Drawing regions have a minimum width Wmin and an ideal width Wideal. The minimum width preferably is chosen to be the smallest width to allow reasonably unfettered expression, and in the embodiment of FIG. 3 is 4 feet. The ideal width preferably is chosen to be roughly equal to the widest span of an average user's arms stretched out horizontally, and in the embodiment of FIG. 3 is 6 feet.

If there is plenty of space on either side of the user's touch point, then the computer system 110 can set the initial region width to Wideal. This is the scenario illustrated in FIG. 3. If the user's touch point is too close to a wall edge for a new drawing region to be centered about it, then the computer system 110 will abut the new drawing region against the wall edge. The new drawing region will still have a width Wideal assuming sufficient space is available, so the new drawing region will not be centered about the user's touch point. On the other hand, if the user's touch point is far enough from the wall edge to create a drawing region centered about the touch point, but the new drawing region would be less than Wmin from the wall edge, then the gap space between the wall edge and the new drawing region is considered unusable. In this case the computer system 110 will extend the new drawing region to fill up the unusable space.

FIG. 4 illustrates a scenario, for the purposes of example, in which two users 101*c* and 101*d* can use the wall simultaneously. Initially, user 101*c* touches the wall 102*c* at touch point 516, and in response thereto the computer system 110 spawns drawing region 512 with toolbar 510. Optionally, user 101*c* then touches controls on toolbar 510 in order to change the line appearance properties within region 512. Next, a second user 101*d* touches the wall 102*c* at touch point 518, which is within the wall 102*c* background (i.e. outside of all pre-existing drawing regions). A second drawing region 514 is then spawned by the computer system 110, with toolbar 520. If user 101*d* draws a line at this time within region 514, the computer system 110 will paint it with the default line properties rather than those previously set by user 101*c* for drawing region 512. User 101*d* then optionally touches controls on toolbar 520 in order to change the line appearance properties within region 514. Subsequent lines drawn in region 514 will then adopt the new line appearance properties. The line appearance properties of region 512 will remain unchanged.

Drawing regions can also be made to automatically track the movement of the stylus. Although numerous possible tracking algorithms will be apparent to the reader, one that follows these minimum rules is preferred: (1) the region does not move so long as the stylus remains relatively near the center of the region; and (2) as the stylus approaches a region boundary, the region moves so that the boundary remains ahead of the stylus.

Drawing regions provide one example of user interaction that can have an effect at a local display wall, but not have an effect on the global workspace data. As illustrated in this example, the locations of the objects 301, 302 are not affected by the assignment of drawing regions, the toolbars, and the drawing overlays within the regions. Of course in other types of user interface interactions, the locations of the objects 301, 302 can be moved, and such movements can be events related to objects in the global workspace data.

A variety of behaviors related to the interpretation of user input based on interaction with a local wall are described in co-pending U.S. application Ser. No. 13/758,984, filed on 4 Feb. 2013, entitled REGION DYNAMICS FOR DIGITAL WHITEBOARD (now U.S. Pat. No. 9,471,192), which is incorporated by reference above. These behaviors are illustrative of local processing of user input and image data at a wall that can be executed by the local computer systems 110, with little or no effect on the shared workspace data maintained at the collaboration server in some embodiments.

FIGS. 5A-5E represent data structures which can be part of workspace data maintained by a database at the collaboration server 105. In FIG. 5A, an event data structure is illustrated. An event is an interaction with the workspace data that can result in a change in workspace data. Thus an event can include an event identifier, a timestamp, a session identifier, an event type parameter, the client identifier, and an array of locations in the workspace, which can include one or more for the corresponding event. It is desirable for example that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example.

Events can be classified as persistent, history events and as ephemeral events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 5A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log.

FIG. 5B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 5C illustrates a data structure which consolidates a number of events and objects into a catchable set called a chunk. The data structure includes a session ID, and identifier of the events included in the chunk, and a timestamp at which the chunk was created.

FIG. 5D illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can for example maintain a current location within the workspace for a user, which can be used each time that a user logs in to determine the workspace data to display at a display client to which the login is associated.

FIG. 5E illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

The system can encrypt communications with client side network nodes, and can encrypt the database in which the spatial event maps are stored. Also, on the client-side network nodes, cached copies of the spatial event map are encrypted in some embodiments, to prevent unauthorized access to the data by intruders who gain access to the client-side computers.

Figure 6:
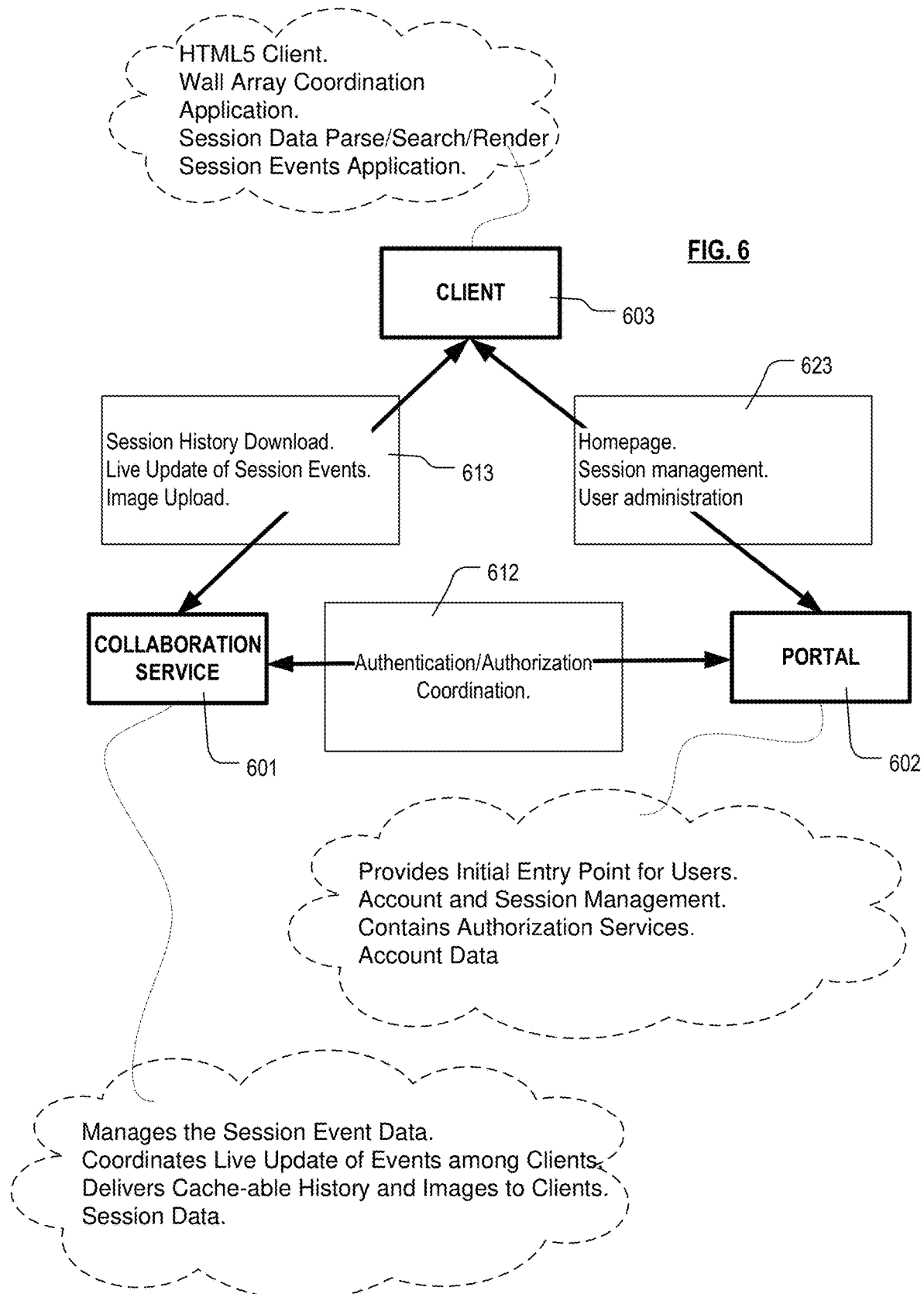
FIG. 6 illustrates functional features of actors in a workspace in one example of a system as described herein.

FIG. 6 is a diagram representing a functional architecture for a distributed collaboration system used to create, modify, distribute and display workspace data for a workspace. The basic configuration includes a collaboration service 601 which manages event data executed by a server, such as server 105, a portal service 602 which can be executed by a server such as server 105 or located in other computer systems accessible to the server, such as a peer network node, and a display client 603 located at a client-side network node, at which the user interaction is active. The display client 603 is in communication with the collaboration service 601 and with the portal 602. The communication channel 613 between the display client 603 and a collaboration service 601 manages the download of session history, and the live update of session events. Also, across this channel 613, a display client 603 can upload images that can be associated with events to the collaboration service 601. The display client 603 is in communication with the portal 602 across communication channel 623. The portal 602 to manages a homepage for the workspace data, session management and user administration. This portal can be utilized for user login, authentications, and for delivering image files and the like as an alternative to, and in parallel with, the communication channel 613. The collaboration service 601 and portal 602 are in communication across channel 612. The collaboration service 601 and portal 602 manage authentication and authorization protocols, and coordinate session administration, and workspace data management.

The display client 603 can be part of a client-side network node including a physical or virtual computer system having computer programs stored in accessible memory that provide logic supporting the collaboration session, including an HTML 5 client, wall array coordination logic for display array implementations, workspace data parsing searching and rendering logic, and a session events application to manage live interaction with workspace data at the server and the display wall.

The portal 602 can be part of a server-side network node including a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data.

The collaboration service 601 can be part of a server-side network node including, and can manage the session event data, coordinate updated events among clients, deliver catchable history and images to clients, and control access to a database stored in the workspace data.

Figure 7:
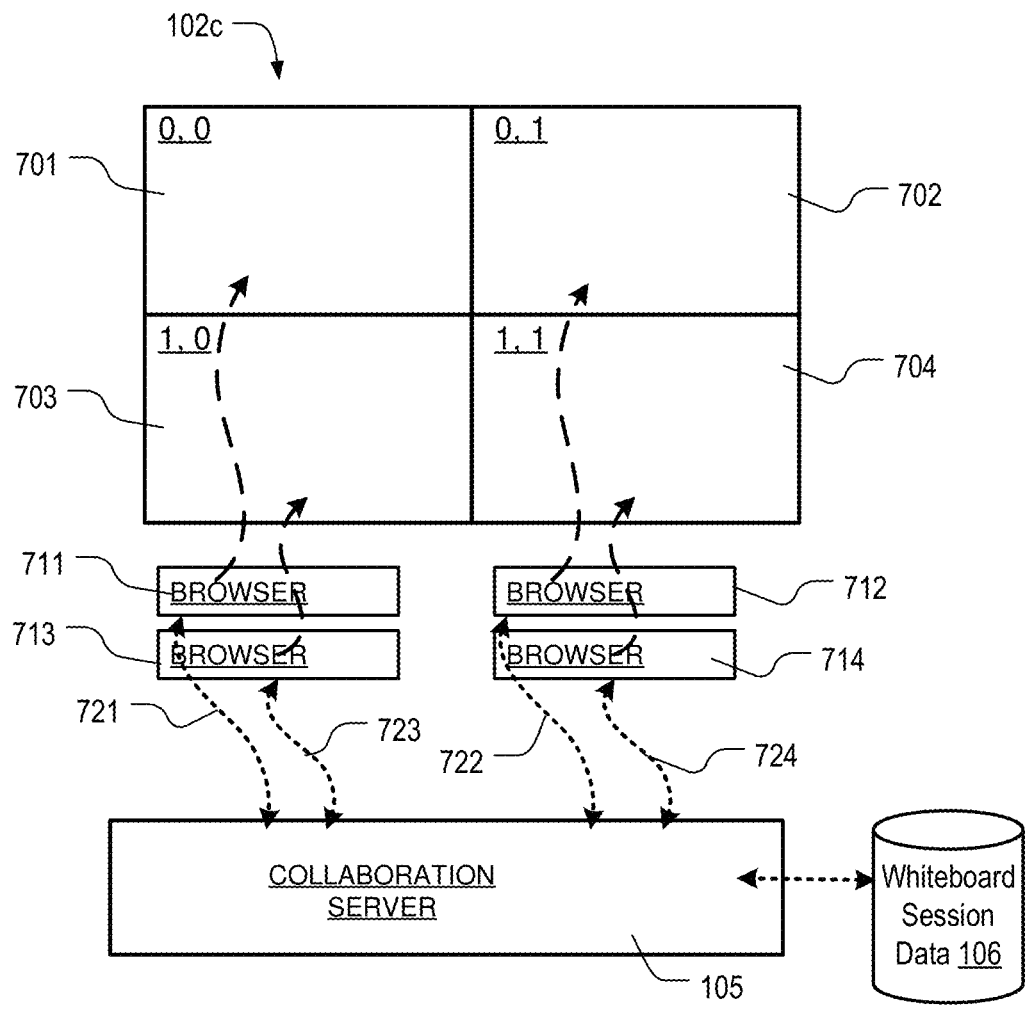
FIG. 7 is a diagram of a digital display implemented using federated displays.

FIG. 7 illustrates an optional technology for implementation of a display wall, based on a display implemented by a plurality of displays 701-704 with federated control. In this example, each display 701-704 is associated with a corresponding display client 711-714. Each display client can execute a browser used to render objects from the workspace on the display area, which has a plurality of subsets of display area which correspond to each the plurality of displays. Each display client can be configured to manage display in a subset of the display area for the session, for example by storing an offset parameter (e.g. 0, 0 for display 701; 0, 1 for display 702; 1, 0 for display 703; and 1, 1 for display 704).

Each of the display clients 711-714 can maintain a communication channel 721-724 with the collaboration server 105, which is in turn coupled to the workspace database 106. The collaboration server 105 and/or the client can maintain a user location within the workspace for each authorized user. When an authorized user is logged in, and has selected a display array such as that shown in FIG. 7 as the display canvas, the collaboration server can link each of the display clients 711-714 into a group associated with the session and user. The collaboration server can then download a current user location within the workspace to the displayable area, or canvas, for each of the display clients in the group. The display clients in the group can independently apply their offset parameter to identify session locations to map onto the subset of the workspace indicated by the offset parameter. In an alternative, the collaboration server can manage the offset computation in communication with each of the display clients 711-714 by delivering to each client the current user location as offset according to the array characteristics.

In order to support coordination of a single display among a plurality of displays, each of the display clients 711-714 can also communicate with each of the other display clients with events that are local to the management of the display area, and which do not have an effect on the global workspace data. Alternatively, the display client 711-714 can communicate solely with the collaboration server 105, which can then direct local events back to the group of display clients associated with the session, and global events to all of the display clients in active sessions with the workspace, and to the database storing workspace data.

The display clients at a single display comprised of federated displays can be implemented individual computer systems coupled to the corresponding displays, or can be implemented using a single computer system with virtual machines coupled to the corresponding displays.

Also, a single display driver can be configured to control the entire surface of a collection of physical displays arranged as a single display wall.

A spatial event map system can include an API executed in coordination by client-side and server-side resources including any number of physical and virtual machines. One example of an API is described below. An API can be defined in a variety of ways, while including the elements supporting maintenance of a spatial event map in a server-side network node or nodes, and supporting sharing of the spatial event map with one or a plurality of active client-side network nodes. In this example, the API is broken down in this example into processes managed by two servers:

Socket Requests Server (Websockets)—used for updating clients with relevant data (new strokes, cards, clients, etc.) once connected. Also handles the initial connection handshake.

Service Requests Server (HTTP/REST)—used for cacheable responses, as well as posting data (i.e. images and cards)

Client-side network nodes are configured according to the API, and include corresponding socket requests clients and service requests clients.

Socket Requests:

The socket server can execute a network protocol that maintains connections via Websockets. The messages used in the API can be encapsulated within the Websocket protocol. Messages can be individual UTF-8 encoded JSON arrays.

Initial loading of history, including all or part of a spatial event map of a collaboration session, at the client-side network nodes can be done using HTTP requests via the Service Requests Server, rather than websockets to support caching.

Socket Connection
http://localhost:4545/<sessionId>/
socket?device=<device>
  sessionId—(string) the id of the session to join
  device—(string) a device type, such as a wall or a desktop.
Message Structure The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Valid Message Types

The following are messages supported by the API example herein. Many of these messages take the following parameter:

sender-id:—the ID of the client sending the message, or −1 if the message originates with the server.
  Client ID Request:
// server←client ["id", sessionId, zoomLevel, x1, y1, x2, y2]
This request can be used to enable interaction with the socket API.
This request starts the asynchronous client-id request/response handshake. The next section explains the asynchronous acknowledgment of the new client (including the provided client ID).
  SessionId—(string) the id of the workspace to join.
  zoomLevel—(int) the zoom level desired by this client
  x1, y1—(int, optional) the desired point of origin for the users viewport
  x2, y2—(int, optional) the desired point of extent for the users viewport
There is no sender-id sent with this message.
The zoom level sent in this message is the zoom level preferred by this client. If the client joins an empty display array (via the "id" message), the client's preferred zoom level becomes the initial zoom level for the display array. If the client joins an existing display array, the preferred zoom level sent in its "id" message is ignored, and the zoom level associated with the existing display array is sent (in the "av" message).
  Client ID Response:
  //server→client [−1, "id", client-id]
Clients are required to store the assigned client ID for use in subsequent socket requests. Informs a new client of their ID. In this case, sender-id is set to −1
  client-id—(string) the ID of the newly-joined client
  Join Room:
  //server←client [sender-id, "jr", room-id, [data]] [sender-id, "jr", "lobby"][sender]
Informs the server of an attempt by the client to join a room.
  room-id—can contain one of lobby or session.
  data—is a wildcard set of arguments, which should be used to initialize the room.
Room Data Arguments:
  Session requires "session-id" containing the id of the session. Array requires:
    arrayId—(string) id of the display array
    x—(integer) x offset of this display
    y—(integer) y offset of this display
    width—(integer) width of this display
    height—(integer) height of this display
Server will respond with a "room" message in response.
  Room Join Response:
  //server→client [−1, "room", [room-id], [databag]] [−1, "room", "lobby", {pin: pin}]
    room-id—contains one of: lobby or session
    databag—is a room-specific bag of variables:
    lobby provides:
    pin—containing the pin for wall authentication
    session provides:
    sessionName—containing the name of the session
  Room List Response
  //server→client [−1, "rl", roomMembershipList]
Informs the client of the room memberships. Room memberships include information regarding clients visiting the same room as you.
    roomMembershipList—(array of room membership objects)
  Session Request:
  //server←client [sender-id, "sr"]
Informs the server that the client would like the list of joinable active sessions.

Session List:
//server→client [−1, "sl", sessionList]
Informs the client of the joinable active sessions.
SessionList—(array of strings)
Object ID Reservation:
Use this to create a new unique object id that is acceptable for creating new history events which create an object.
// server↔client [sender-id, "oid"]
Server responds with:
[−1, 'oid', <new-object-id>]
History Event
All persistent events are sent as HistoryEvent. This includes:  moving windows  setting text  deleting windows  creating windows.
HistoryEvents are written to the session's history and returned when the history is retrieved.
HistoryEvents are sent to the server without an eventId. The server assigns an eventId and broadcasts the event to all clients (including the originating client).
New object ids can be reserved using the oid message.
Basic Message Format
// server←client [client-id, "he", target-id, event-type, event-properties]
   client-id—(string) the ID of the originating client
   target-id—(string) the ID of the target object/widget/app to which this event is relevant
   event-type—(string) an arbitrary event type
   properties—(object) a JSON object describing pertinent key/values for the event.
// server→client[client-id, "he", target-id, event-id, event-type, event-properties
   client-id—(string) the ID of the originating client
   target-id—(string) the ID of the target window to which this event is relevant
   event-id—(string) the ID of the event in the database
   event-type—(string) an arbitrary event type
   properties—(object) a JSON object describing pertinent key/values for the event.
  Example Interaction: Moving Objects
A good example illustrating some of the persistent event/ephemeral event classification is moving an object. While the object is being moved or for example resized by dragging, a series of ephemeral events (termed "volatile events VEs") is sent to the server, and re-broadcast to all clients in the session. Once the user finishes moving the object, the client should send a history event to specify the rect and order of the object:
["511d6d429b4aee0000000003","he",
"511d6f9c9b4aee0000000039","position",{"rect"} . . .
The server will respond with the newly persisted HE record. Note the inclusion of the record's eventId.
// server→client format of 'he' is: [<clientId>, <messageType>, <targetId>, <eventId>,
Note: The eventId will also be included in history that is fetched via the HTTP API.
  History Events by Object/Application Type
Session
  Create—Add a note or image on the work session
  stroke—Add a pen or eraser stroke on the background
Note
  text—Sets or update the text and/or text formatting of a note.
  delete—Remove the note from the work session
  position—Update the size or location of the note in the work session
  pin—Pin or unpin the note
  stroke—Add a pen or eraser stroke on top of the image Image
  delete—Remove the note from the work session
  position—Update the size or location of the note in the work session
  pin—Pin or unpin the note
  stroke—Add a pen or eraser stroke on top of the image
History Event Details
  text
sets and styles the text of a note. Both the text attribute and style attribute are optional.
//server←client[client-id, "he", target-id, "text", {"text": "abcdef",
  create
sent to clients when the server receives a card create (cc) message or an image upload.
For create messages the target-id is the session-id.
//server→client[client-id, "he", session-id, event-id, "create",
"id":"5123e7ebcd18d3ef5e000001"
Properties
  id—(int) unique identifier for the window
  baseName—(string) the background image file name
  ext—(string) the background image file extension
  rect—(object) the location of the window
  actualWidth—(int) the background image width
  actualHeight—(int) the background image height
  order—(int) z order
  type—(string) "note" for objects that can have text, "image" for other objects
regionId—(string) the canvas region if the object is created in a canvas region
  hidden—(boolean) whether the window is currently hidden
  delete
used to make a window disappear from the session. Delete is an undo-able action.
//server←client[client-id, "he", target-id, "delete", {"hidden":true}]// server→
  Position
used to save the position of a window after a move, fling, or resize
//server←client[client-id, "he", target-id, "position", {"rect":[−1298,−390,−1018
Properties
  rect—(object) the location of the target window
  order—(int) the z-order of the target window
  stroke
used to save a stroke
/server←client[client-id, "he", target-id, "stroke", {"size": 10, "brush":
Properties
  locs—(array) stroke locations in the format: [10, 1, 10, 2, 12, 3] where coordinates are paired [x, y, x, y, x, y] in an array
  pin
sent to clients to pin a note or image in place or to remove an existing pin. Windows that are pinned cannot be moved or resized until they are unpinned.
// server→client[client-id, "he", session-id, event-id, "pin", {"pin": true}]
Properties
  pin—(boolean) true is pin, false is un-pin
Volatile Event
Volatile events are ephemeral events not recorded in the undo/playback event stream, so they're good for in-progress streaming events like dragging a card around the screen, and once the user lifts their finger, a HistoryEvent is used to record its final place.
// server↔client[client-id, "ye", target-id, event-type, event-properties]
client-id—(string) the ID of the originating client
target-id—(string) the ID of the target window to which this event is relevant
event-type—(string) an arbitrary event type
properties—(object) a JSON object describing pertinent key/values for the event.
Volatile Events by Object/Application Type
Session
sb—Starts a stroke. Used to render strokes on one client while they are being drawn on another client.
sc—Continues a previously started stroke by giving another point to include. Used to render strokes while they are being drawn on another client.
se—Ends a previously started stroke.
Note
fling—Animates a note sliding from one place in the work session to another. This is the visual response to a flick or fling action by the user.
position—Live updates the position of a note while its being moved by another user.
sb—Starts a stroke. Used to render strokes on one client while they are being drawn on another client.
sc—Continues a previously started stroke by giving another point to include. Used to render strokes while they are being drawn on another client.
se—Ends a previously started stroke.
Image
fling—Animates an image sliding from one place in the work session to another. This is the visual response to a flick or fling action by the user.
position—Live updates the position of an image while its being moved by another user.
sb—Starts a stroke. Used to render strokes on one client while they are being drawn on another client.
sc—Continues a previously started stroke by giving another point to include. Used to render strokes while they are being drawn on another client.
se—Ends a previously started stroke.
Types of Volatile Events
Fling
used to broadcast a fling action to all connected clients.
//server↔client[client-id, "ye", target-id, "fling", {"velocityX": 10, "velocityY"}
Properties
velocityX (int) the x component of the fling vector
velocityY (int) the y component of the fling vector
position—ve
used to broadcast intermediate steps of a window move
//server↔client[client-id, "ye", target-id, "position", {"rect":[−1298,−390,−1018
Properties
rect (object) the location of the target window
order (int) the z-order of the target window
sb:
used to broadcast the beginning of a stroke
//server↔client[client-id, "ye", target-id, "sb",{"brush":1, "size":2, "color"}
Properties
x,y—(int) the starting point of this stroke
strokeId—(string) the ID of the new stroke
sc:

//server↔client[client-id, "ye", target-id, "sc", {"x":100, "y":300, "strokeId"}
used to broadcast a continuation of a stroke
Properties
x,y—(int) the new end-point of the stroke
strokeId—(string) the ID of the new stroke
se:
//server↔client[client-id, "ye", target-id, "se", "strokeId": "395523d316e942b496a2c8a6fe5f2cac"}
End the stroke specified by stroke-id
stroke-id—(string) the ID of the continued stroke
Delete Stroke:
//server→client[sender-id, "sd", stroke-id, target-id]
Delete a stroke.
stroke-id—(string) the ID of stroke
target-id—(string) the ID of the stroke target
Undo:
Undoes the last undo-able action (move, set text, stroke, etc).
//server←client
[sender-id, "un"]// server→client
[client-id, 'undo', target-
Undo Example: Move a window and then undo that move
The following example shows a move, and how that move is undone.
//Client sends move and then an undo message.
The server removes the history event of the move from the session history and notifies the client that this record will no longer be a part of the session's spatial event map, taking it out of the history timeline. Future requests of the history via the HTTP API will not include the undone event (until after a redo).
Display Array Dimensions:
//server→client [−1, "dd", arrayId, width, height]
Informs clients of changes to the overall display array width and height. This may not be utilized with the client-side network node has resources to manage the local display of portions of the spatial event map.
arrayID—(string) the ID of the display array
width, height—(integers) width and height of the display array in pixels
Pan array:
//client→server [sender-id, "pa", newArrayOffsetX, newArrayOffsetY] Inform the server of a pan to a new location.
newArrayOffsetX, newArrayOffsetY . . . (int) the new location of the display array after panned.
Session change:
//server→client [sender-id, "cs", sessionId] Inform siblings in a display array that the session has changed.
SessionId—(string) is the id of the session to switch to
Zoom Change:
//client→server [sender-id, "zc", zoomLevel, zoomCenterX, zoomCenterY]
Inform the server that a zoom was requested.
zoomLevel (integer) the zoom level to transition to, from 1 to 11
zoomCenterX (integer) the x coordinate of the origin of the zoom
zoomCenterY (integer) the y coordinate of the origin of the zoom
Map-mode change:
//client→server
[sender-id, "mm", zoomLevel, zoomCenterX, zoomCenterY]
Inform the server that map-mode was requested. Superficially, this operates near identically to the zoomchange message, except where dozens or hundreds of zoom-change messages are meant to be sent rapid-fire with tweening between them in the graphical treatment, the map-mode message is intended for a single zoom snap with different transition effects.

zoomLevel—(integer) the zoom level to transition to, from 1 to 11 zoomCenterX—(integer) the x coordinate of the origin of the zoom zoomCenterY—(integer) the y coordinate of the origin of the zoom Create card // server←client

[sender-id, "cc", templateId, regionId, x, y, x2, y2]

templateId—(string) the id of the card template to be used regionId—(string) the canvas region id of the originating event (if any)

x, y, x2, y2—(int) the desired rect for the new card

User Permissions

// server→client [sender-id, "up", permissions]

permissions a hash of permission types and true/false to indicate if the authenticated user has that permission. Currently the only permission is "can_share" indicating users who can share the session with others.

Save Position:

// client→server [−1, "sp", zoomLevel, x, y]

Saves the current screen position. On reconnect, the client will receive a 'zc' (zoom-change) and 'pa' (pan-array) message sending them back to this location.

zoomLevel (integer) the zoom level the device is currently on x (integer) the x coordinate of the origin of the screen y (integer) the y coordinate of the origin of the screen Stroke IDs Stroke ID's are selected by the client. Currently they are the sender-id composed with an increasing integer, separated by a dot. This is to make it unique within the server context among all clients.

Target IDs

A stroke may be attached to a specific target in the session, like a sub-canvas (called a "card") that floats above the main canvas. In the case of a stroke belonging to a card, the target ID field would contain the card ID. Strokes destined for the main canvas in the session are designated by having their target ID be the same as the session name.

Establishing Connections

When a client establishes a new websocket connection with the server, the server first chooses a unique client ID and sends it in an "id" message to the client. It then sends the "pa" message with senderid set to −1.

The representative flow then is for the client to perform an HTTP GET "/:sessionId/objects" (documented below) to receive information about the cards in the session. Then the client requests "/:sessionId/history" (also documented below), which receives an array of history urls. These are broken into batches to improve cachablity. The client then GETs each url not stored in the local cache, and the server will respond with the stroke data for those history batches.

Service Requests

History:

Gets a list of history bookmarks. Each bookmark is a span of cached stroke history.

curl http://localhost:4545/<sessionId>/history sessionId name of the session you're getting the history for Response Headers HTTP/1.1 200 OKX-Powered-By: ExpressAccess-Control-Allow-Origin: *Access-Control-Allow-Headers:

Response

["/<sessionId>/history/<startTime>/<endTime>?b=1"]

r<sessionId>/history/<startTime>/<endTime>?

sessionId—(string) id of the session to switch to startTime—(integer) beginning timestamp endTime—(integer) ending timestamp b—cache buster Retrieving a block of history:

Gets the history between start time and end time. A request needs to be made for each returned span of history.

curl http: //localhost:4545/<sessionId>/history/<startTime>/<endTime>?b=<cache-buster> sessionId—id of the session you're getting the history for startTime—the start time as given by initial history request endTime—the end time as given my initial history request cacheBuster—a simple key that will be changed whenever client-stored cache is no longer valid Response Header HTTP/1.1 200 OKX-Powered-By: ExpressAccess-Control-Allow-Origin:

*Access-Control-Allow-Headers: X-Requested-With

Content-Type:

application/j son

Content-Length: 2134

ETag: 1346968307576

Date: Fri, 14 Sep. 2012 17:35:14 GMT

Connection: keep-alive

Response

```
[
  [
    4,
    "sx",
    "4.4",
    [537, 650, 536, 649, 536, 648, ...],
    {
      "size": 10,
      "color": [0, 0, 0, 1],
      "brush": 1
    },
    1347644106241,
    "cardFling"
  ]
]
```

(see documentation for sx "stroke-complete" websocket message)

Retrieving Objects:

Gets the objects (cards/images) for the requested session.

curl http://localhost:4545/<sessionId>/objects sessionId id of the session you're getting the history for Response Header

HTTP/1.1 200 OK

X-Powered-By: Express

Access-Control-Allow-Origin: *

Access-Control-Allow-Headers: X-Requested-With

Content-Type: application/j son; charset=utf-8

Content-Length: 285

Date: Fri, 14 Sep. 2012 17:35:14 GMT

Connection: keep-alive

Response

```
[
  {
```

```
        {
            "eventType": "oc",
            "id": "50536840ce64b39439000005",
            "baseName": "sessions/all/green",
            "ext": "JPEG",
            "rect": [-239, 49, 361, 649],
            "arrayId": 3,
            "clientId": 3,
            "regionId": null,
            "sessionId": "cardFling",
            "actualWidth": 600,
            "actualHeight": 600,
            "order": null,
            "_id": "50536840ce64b39439000005",
            "type": "image"
        },
        {
            "eventType": "oc",
            "id": "50536b66ce64b39439000006",
            "baseName": "sessions/all/orange",
            "ext": "JPEG",
            "rect": [-97, 190, 503, 790],
            "arrayId": 5,
            "clientId": 5,
            "regionId": null,
            "sessionId": "cardFling",
            "actualWidth": 600,
            "actualHeight": 600,
            "order": null,
            "_id": "50536b66ce64b39439000006",
            "type": "image"
        }
    ]
```

Card Templates:
Gets a list of global card templates for creating cached, re-usable cards. This is different from uploading a file as the same background-image is used for all cards created with this template.
curl http://localhost:4545/card_templates.json
Response

```
    [
        {
            "id":"50901cb0b9a18c190902a938",
            "width":600,
            "thumbnail":"card_templates/thumbnails/pink.jpeg"
        },
        {
            "id":"50901cb0b9a18c190902a939",
            "width":600,
            "thumbnail":"card_templates/thumbnails/green.jpeg"
        }
    ]
```

These values can be used to send a create card message:
// creates a new card using the pink template above ["cc", "50901cb0b9a18c190902a938", <regionIdOrNull>, <x>, <y>]
Upload:
Sends an image to the server to be placed in the session.
curl-F "file=@photo.JPG"-F "x=236"-F "y=832"-F "clientId=10"-F
"sessionId=cardFling"
-F "arrayId=10"-F "order=23"-F "x2=899"-F "y2=1495"-F
"filename=photo.jpg"
http://localhost:4545/<sessionId>/object/upload
Params
x: x position of drop
y: y position of drop
clientId: client Id
sessionId: session Id
arrayId: array identifier
order: z order
x2: x position of bottom right corner of drop
y2: y position of bottom right corner of drop
filename: name of file uploaded The API describe above provides one example message structure. Other structures may be utilized as well, as suits a particular implementation.

In an embodiment of the collaboration system, an application program interface API is executed by the collaboration server 105 and display clients based on two communication channels for each display client, as suggested with reference to FIG. 6.

In some embodiments a federated display may be deployed. In a federated display, each of the display clients 711-714 can independently maintain two channels with the server. The first channel is a message based system configured for communications about live events. In one example, this first channel is implemented using a set of socket requests over a Web socket channel with the collaboration service 601, and used by the server for updating clients with relevant data (new strokes, cards, clients, etc.) once connected. The message based channel can also handle the initial connection handshake. A second channel is a more stateless type link with the portal 602, such as n HTTP/REST interface, which can be used for cacheable responses, as well as posting data (i.e. images and cards). Also an initial loading of workspace data to a display client can be done using HTTP requests rather than the message based channel (Websockets) to support caching.

Figure 8:
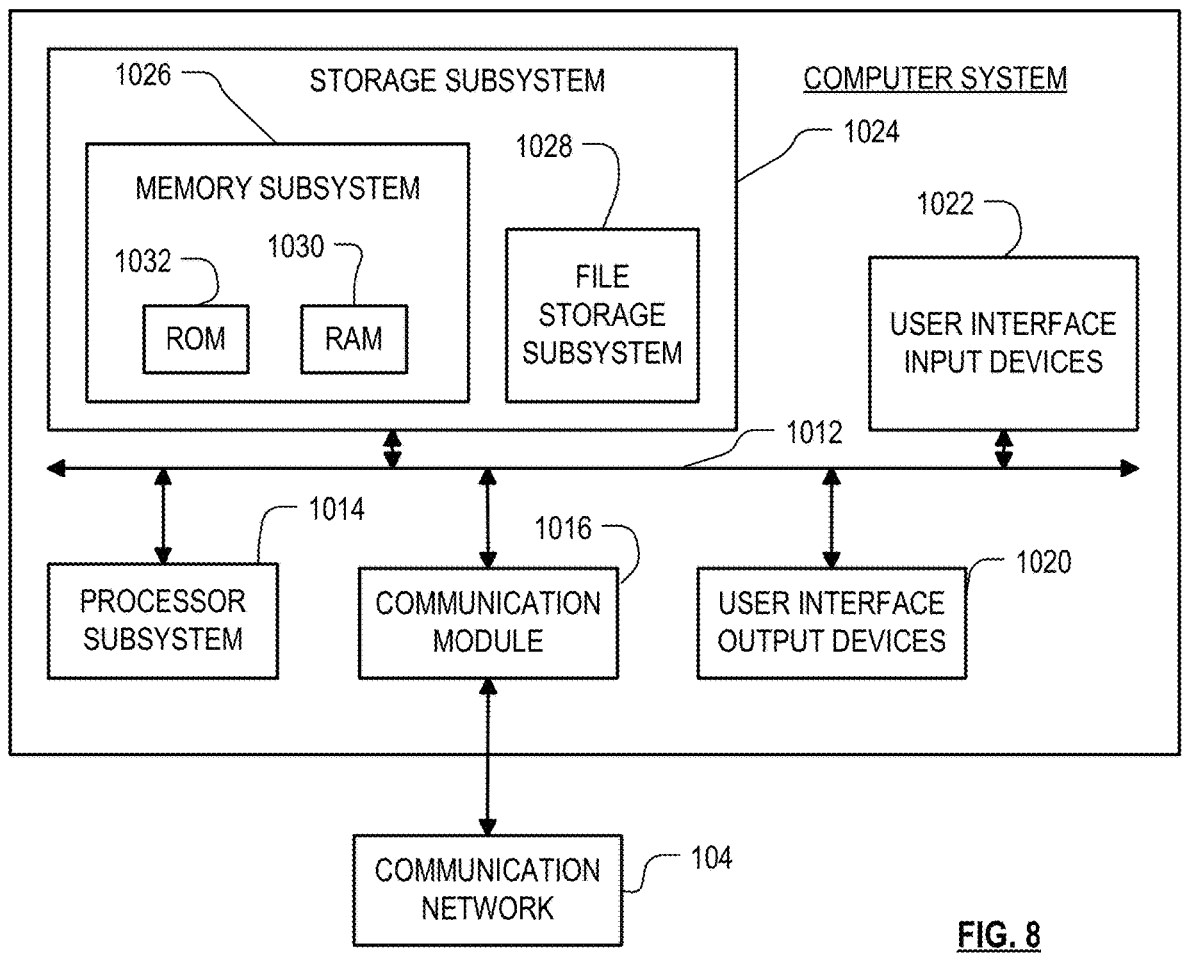
FIG. 8 is a simplified block diagram of the computer system 110, e.g. a client device computer system (FIG. 1B).

FIG. 8 is a simplified block diagram of a computer system, or network node, which can be used to implement the client-side functions (e.g. computer system 110) or the server-side functions (e.g. server 105) in a distributed collaboration system. A computer system typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with the computer system. Communication module 1016 provides physical and communication protocol support for interfaces to outside networks, including an interface to communication network 104, and is coupled via communication network 104 to corresponding communication modules in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display (including the touch sensitive portions of large format digital display 102c), audio input devices such as voice recognition systems, microphones, and other types of tangible input devices. In general, use of the term "input device" is intended to include all possible types of devices and ways to input information into the computer system or onto computer network 104.

User interface output devices 1020 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital display 102c. The display subsystem may also provide non-visual display such as via audio output devices. In general, use of the term "output device" is intended to include all possible types of devices and ways to output information from the computer system to the user or to another machine or computer system.

Storage subsystem 1024 stores the basic programming and data constructs that provide the functionality of certain embodiments of the present invention.

The storage subsystem 1024 when used for implementation of server side network-nodes, comprises a product including a non-transitory computer readable medium storing a machine readable data structure including a spatial event map which locates events in a workspace, wherein the spatial event map includes a log of events, entries in the log having a location of a graphical target of the event in the workspace and a time. Also, the storage subsystem 1024 comprises a product including executable instructions for performing the procedures described herein associated with the server-side network node.

The storage subsystem 1024 when used for implementation of client side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 1024 comprises a product including executable instructions for performing the procedures described herein associated with the client-side network node.

For example, the various modules implementing the functionality of certain embodiments of the invention may be stored in storage subsystem 1024. These software modules are generally executed by processor subsystem 1014.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer," execute on the processor subsystem 1014 in response to computer instructions and data in the host memory subsystem 1026 including any other local or remote storage for such instructions and data.

Bus subsystem 1012 provides a mechanism for letting the various components and subsystems of a computer system communicate with each other as intended. Although bus subsystem 1012 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display 102c. Due to the ever-changing nature of computers and networks, the description of computer system 110 depicted in FIG. 8 is intended only as a specific example for purposes of illustrating the preferred embodiments of the present invention. Many other configurations of the computer system are possible having more or less components than the computer system depicted in FIG. 8. The same components and variations can also make up each of the other devices 102 in the collaboration environment of FIG. 1, as well as the collaboration server 105 and display database 106.

Figure 9:
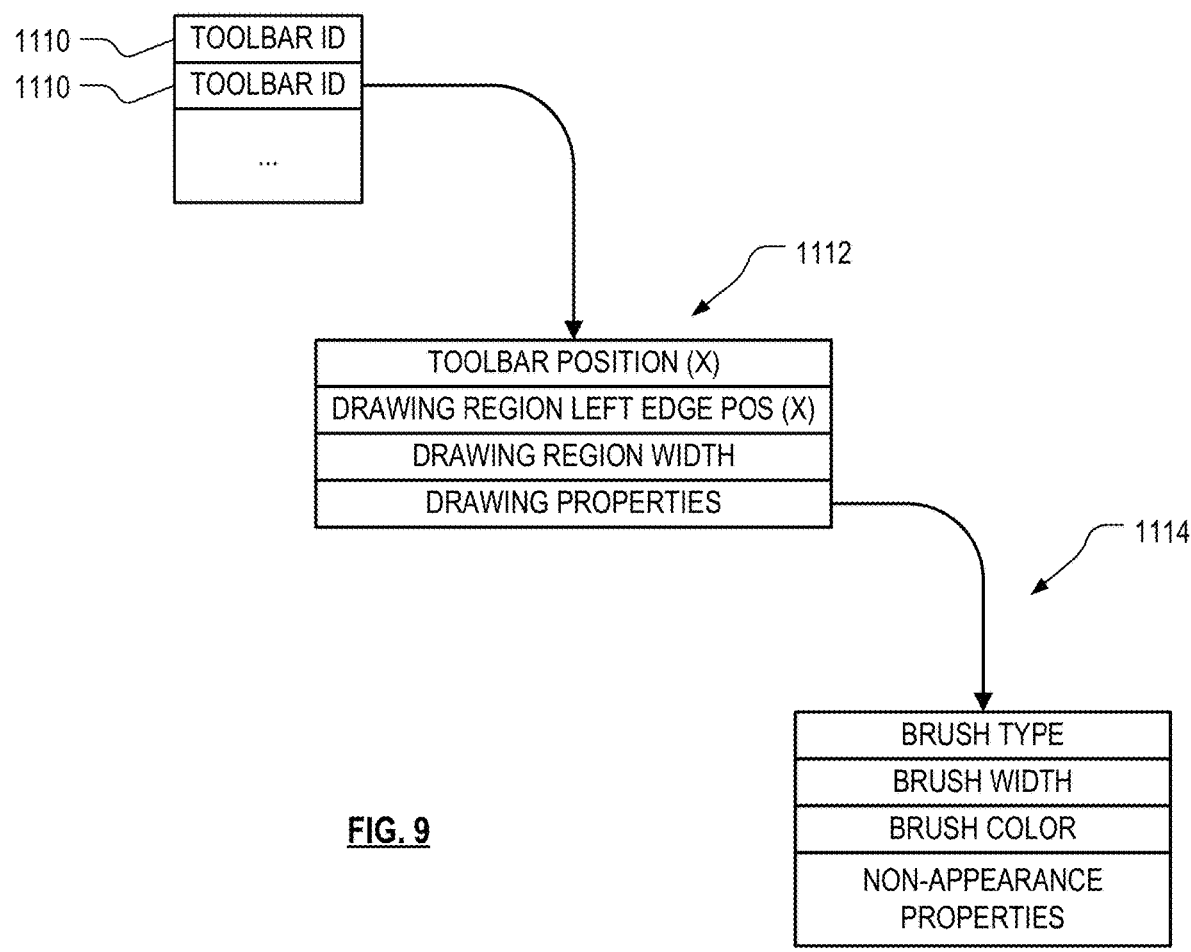
FIG. 9 is a schematic drawing of a database stored accessibly to the client device computer system 110 (FIG. 1B).

Certain information about the drawing regions active on the digital display 102c are stored in a database accessible to the computer system 110 of the display client. The database can take on many forms in different embodiments, including but not limited to a MongoDB database, an XML database, a relational database, or an object oriented database. FIG. 9 is a schematic diagram illustrating certain information that the database contains, and certain relationships among the data.

In embodiments described herein, each drawing region is considered to be a child of a toolbar. The touching of a point on the wall background spawns a toolbar, which in turn spawns a drawing region (though the toolbar is not necessarily visible until the drawing region opens). Similarly, to close a drawing region, a user touches a "close" icon on the drawing region's toolbar. Thus in FIG. 9, the database is headed by one or more toolbar IDs 1110. Each toolbar ID 1110 includes or points to a respective block 1112 of data, indicating the horizontal position of the toolbar, the horizontal position of the left edge of the toolbar's drawing region, with width of the drawing region, and a set of drawing properties for the drawing region. It will be appreciated that many variations are possible, such as specifying the right edge position of the drawing region rather than the left, and specifying the opposite edge position rather than the drawing region width. The toolbar position has only a horizontal value, because in an embodiment, it always remains at the same vertical position. In another embodiment both horizontal and vertical positions may be specified.

The drawing properties include or point to an array 1114 of drawing attributes, each in association with one or more values. The drawing properties in FIG. 9 include a brush type, the value of which may for example indicate "paint," "ink," "crayon," "marker" or "eraser," each of which has a different character of appearance when drawn on the display 102c. The drawing properties in FIG. 9 also include a brush width, which can take on any value in a range of available values. The drawing properties in FIG. 9 also include a brush color, which has three associated values: red, green and blue content. As used herein, the three attributes brush type, brush width and brush color are considered to constitute "line appearance properties." Drawing attributes 1114 may in various embodiments also include other attributes, such as those that affect the location of the line or the location of part of the line. These properties may include such attributes as corner-rounding radius, or Bezier curve parameters. As can be seen in FIG. 11, there is no requirement that the drawing attributes (including the line appearance properties) for different drawing regions be the same. They can be established independently of each other, so there is no need that they be identical. In a typical case they will not be identical.

In order to draw a line on the display 102c, a user provides "drawing user input" which indicates the drawing of the line. While other embodiments may allow a user to draw with a finger, in the embodiment of FIG. 1, only a stylus can be used to indicate the drawing of a line. Intuitively, the user so indicates by touching the stylus to the display 102c surface, within a drawing region, and dragging the stylus along the positions desired for the line. The end of a line drawing operation is indicated by lifting the stylus from the display 102c surface. The local computer system 110 determines from the user input where the points on the line are to be positioned, and displays them on the display 102c. The computer system 110 also transmits the stroke information to the collaboration server 105 (FIG. 1B), which writes the information into its display database 106 and transmits it back to the various devices 102 sharing the session. Each of the devices 102 can then display the line (so long as the line intersects the device's viewport), so all such devices 102 will show the line at roughly the same time.

FIGS. 10-14 are flowcharts illustrating logic executed by the server, the display clients, or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

FIG. 10 illustrates basic logic executed on the server-side when a user joins a session as part of a persistent workspace. The flowchart begins with a login by the user (1210), in which the user may enter a user identifier in a web portal access through a device possessed by the user, such as a personal computer, a touchpad, a smart phone, etc. Next, a user authentication protocol is executed (1212), where a protocol, for example, can include requiring the user to enter a personal password, to verify that the user is in fact a person who has entered the user identifier. Next, the collaboration server, using for example the portal machine, can present links to workspaces in which the authenticated user is authorized to participate (1214). Next, the collaboration server can determine a selected display client, and a selected workspace for the user (1216). This determination can be made by an exchange of messages between the user possessed machine, and the portal using the communication channel on which the authentication protocol is executed. When the display client and workspace are identified, the collaboration server can enable the display client to download data for the selected workspace (1218). Also, the collaboration server can add the client to a live event channel for the selected workspace (1220).

FIG. 11 illustrates basic two-channel logic executed on the client-side when a user joins a workspace. The flowchart begins with a login by the user (1230) executed on a first channel, in which the user may enter a user identifier and transmit it to the web portal. Next, the user authentication protocol is executed (1232). The user then opens a page at the portal using the communication channel on which the authentication protocol is executed, which displays links for authorized workspaces (1234). Next, the user enters data identifying a selected workspace and display client to be used in the current session (1236) using the first channel. After the server enables the selected display client, the user activity can transfer to a channel between the display client and the server, which can then download the workspace data for the selected session (1238). The display client can then traverse the workspace data and construct an image for the display area managed by the display client (1240). Also, the display client can then join the live event channel (1242). The client-side network node and the server-side network node can establish a protocol for encryption and decryption of the spatial event map data during establishment of the session.

In one example, the process of downloading the workspace data includes delivering the event objects for the session to each display client. Included with the workspace data, a current user location can be provided. Alternatively, the workspace data can be delivered, followed by a sequence of messages which identify to the display client how to compute an offset from a default location, such as at the center of the workspace data, to a current location associated with the user. Each display client then can traverse the event objects to identify those objects having session locations which map to the display area managed by the display client. The logic to traverse the event objects can include an R-TREE search for example, which is configured to find objects in the workspace that map to the display area. The identified objects can then be rendered, possibly communicating with the portal to obtain data relevant to the objects, on the display area managed by the display.

Figure 12:
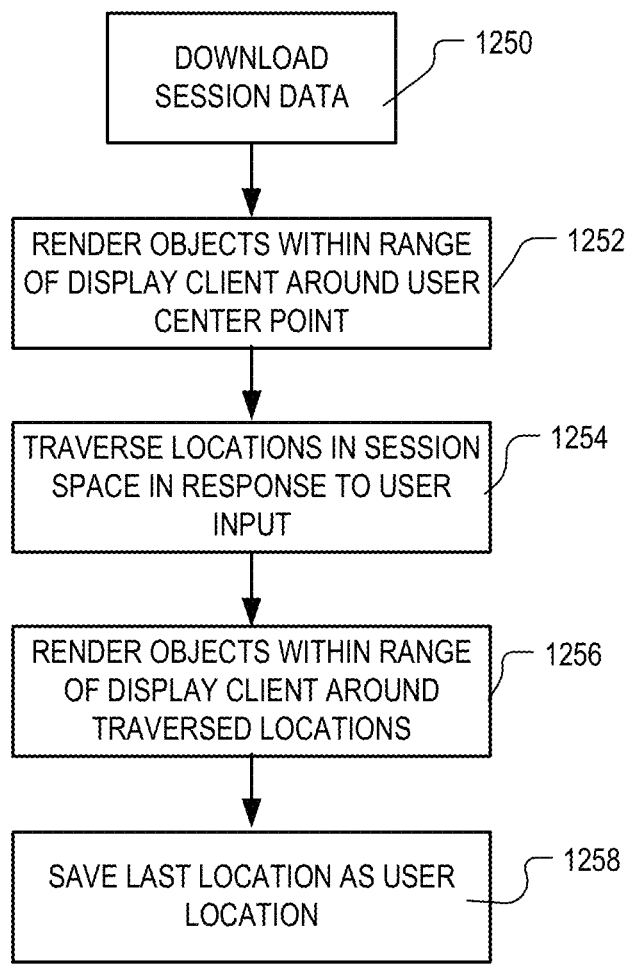
FIG. 12 is a flowchart illustrating aspects of client-side logic for a display client in a wall being used for a collaboration session.

FIG. 12 illustrates basic logic on the client-side related to downloading workspace data. Logic begins with a download of workspace data from the collaboration server (1250). The display client renders the objects that are within the range of the display client around the user focus (1252), where the user focus is determined from the location within the workspace that can be provided by the server, or maintained at the client-side network node. The display client holds the workspace data, or at least portions of the workspace data, including objects having current locations in workspace data, that are close to the user focus. During the session, in response to user input or other data, the display client traverses locations in the workspace to determine the current location in the workspace (1254). The display client then renders objects within the range around the traversed locations (1256). At the end of the session, the last location within the workspace mapped by the display client is saved as the user location on a collaboration server (1258).

Figure 13:
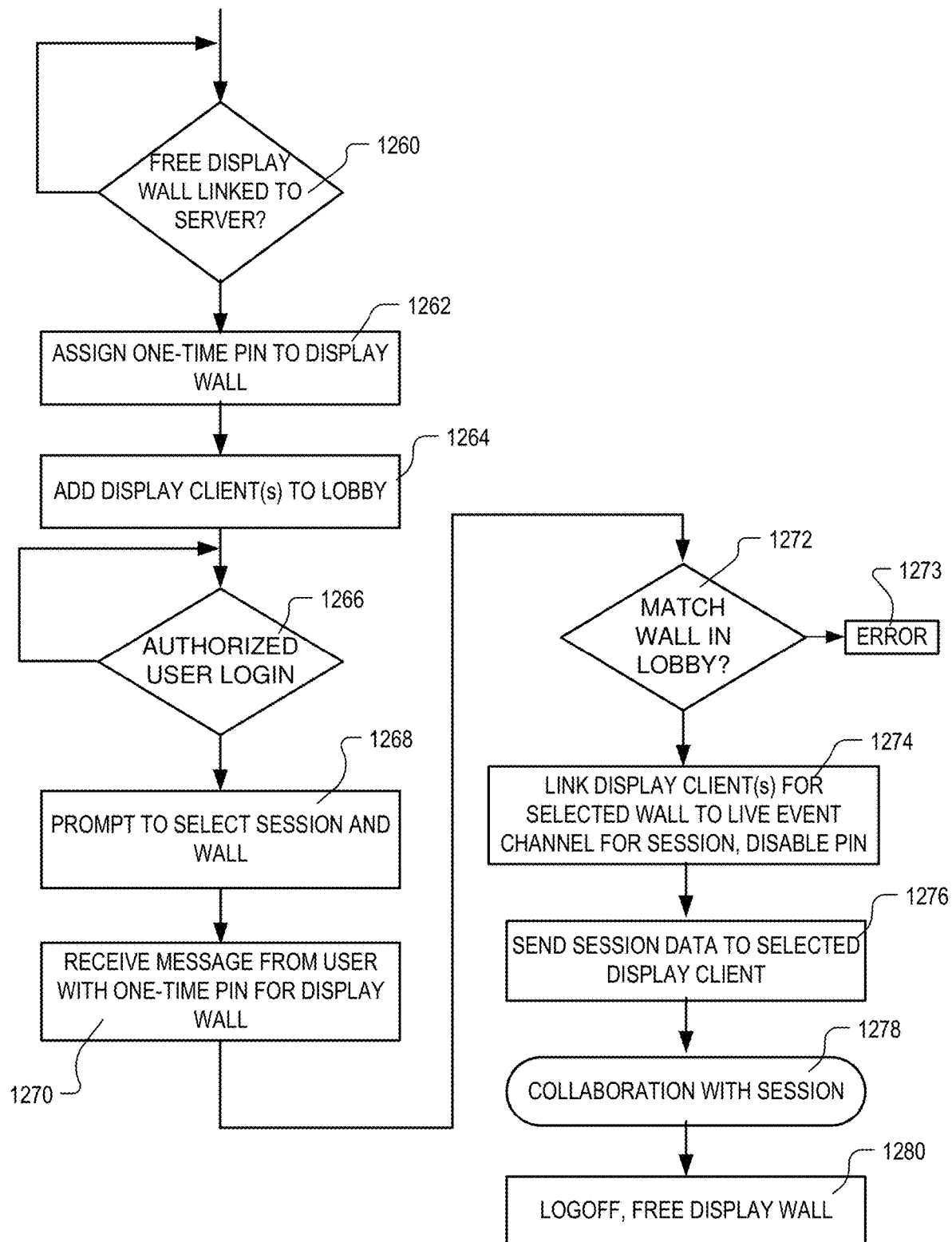
FIG. 13 is a flowchart illustrating aspects of server-side logic managing utilization of distributed display walls in a collaboration system.

FIG. 13 illustrates logic executed by the server-side for managing access to displays to which access is shared among many users. In this example, the server maintains a list of free display walls having active links to the server. These links can be set up when the display walls are turned on, and maintained during waiting periods in which the display wall is idle. The server can include logic to determine whether a free display wall has a link to the server (1260). If a wall is detected that has a link to the server, then it is assigned a one-time identification code or PIN. When the identification code is assigned, then the wall is added to a "lobby," which comprises a list of available walls (i.e. free walls) in the collaboration system (1264). The server also executes a loop waiting for authorized user logins (1266). When a login is detected, the server prompts the user to select a workspace and to select a wall, for which the user is authorized (1268). The server then requires the user to enter the one-time identification code associated with the selected wall (1270). If the server does not receive a matching identification code for the selected wall (1272), then an error signal is issued (1273). When the server receives a matching identification code for the selected wall (1272), then the display client or clients associated with the selected wall are linked to a live event channel for the session, and the one-time identification code is disabled or changed, while the wall is occupied (1274). Also, the server sends the workspace data to the selected display client or clients (1276). The user is then able to collaborate with the session after receiving the workspace data (1278). When the user logs off of the session, then the display wall is freed (1280). If the display wall remains available, it can be indicated to be a free display wall to the server, and added to the lobby with a new identification code, following sequence of steps 1260, 1262, 1264. In some embodiments, the identification code is changed upon expiration of a time out interval, providing security against logins by intruders who might steal the identification code from a wall that is not in use.

Figure 14:
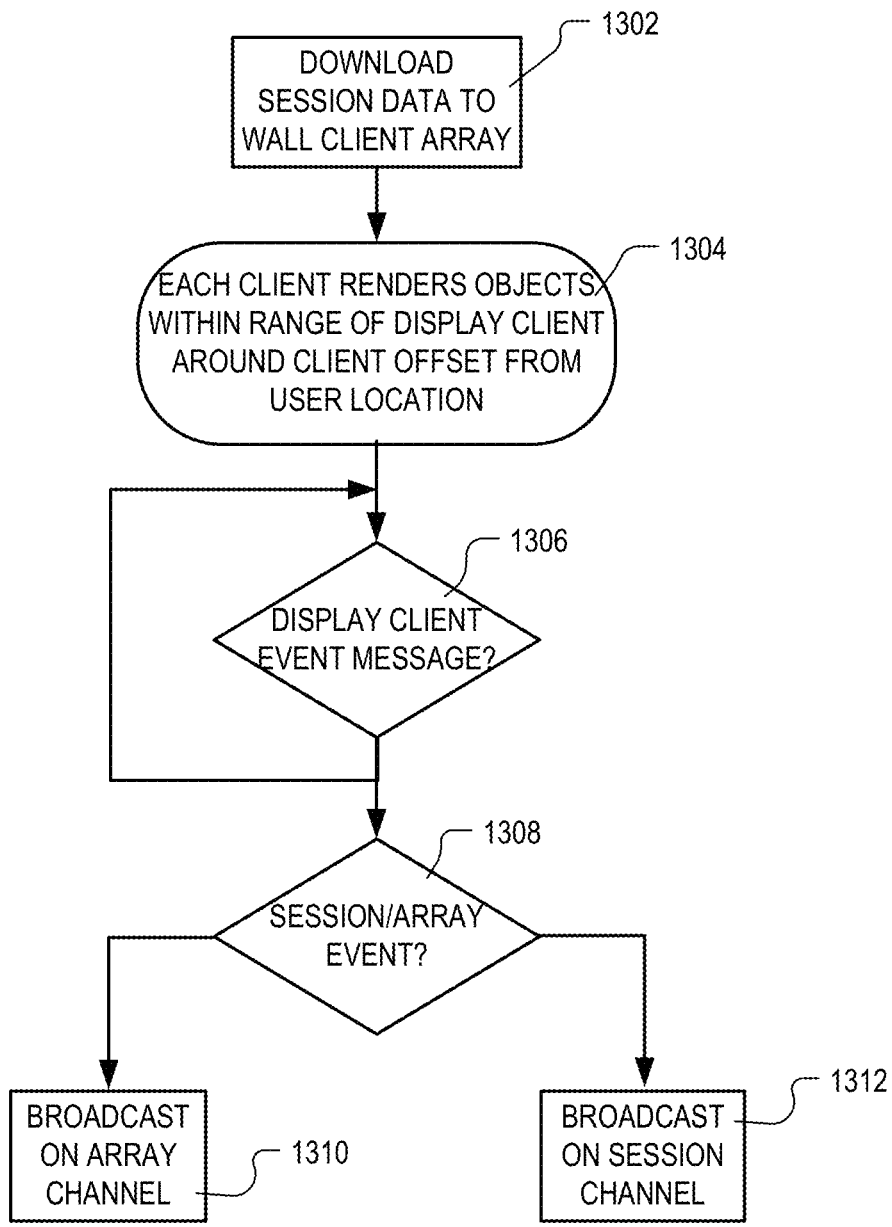
FIG. 14 is a flowchart illustrating aspects of client-side logic for a federated display system being utilized as a display in a collaboration system.

FIG. 14 illustrates basic logic executed on the server-side to manage a federated display array. The first step in this flowchart involves downloading the workspace data to each of the display clients in the array (1302). Each display client renders objects within the range of the display client around a client offset from the user location (1304). The server monitors for client event messages (1306). When the server receives a client event message from one of the display clients in the array, it determines whether the message relates to the workspace data or only the array (1308). Array messages are broadcast on an array channel so that only those display clients participating in the federated display array receive the messages (1310). Workspace data messages are broadcast on the collaboration channel, so that all of the display clients participating in sessions with workspace data are updated as appropriate (1312). Those messages that relate only to the federated display array, can include such messages as those that update the location of toolbars and drawing regions as described above. Also, messages that do not change the location of objects in the workspace, and do not create or modify objects that are part of the workspace data, can be determined to be local array only messages.

Figure 15:
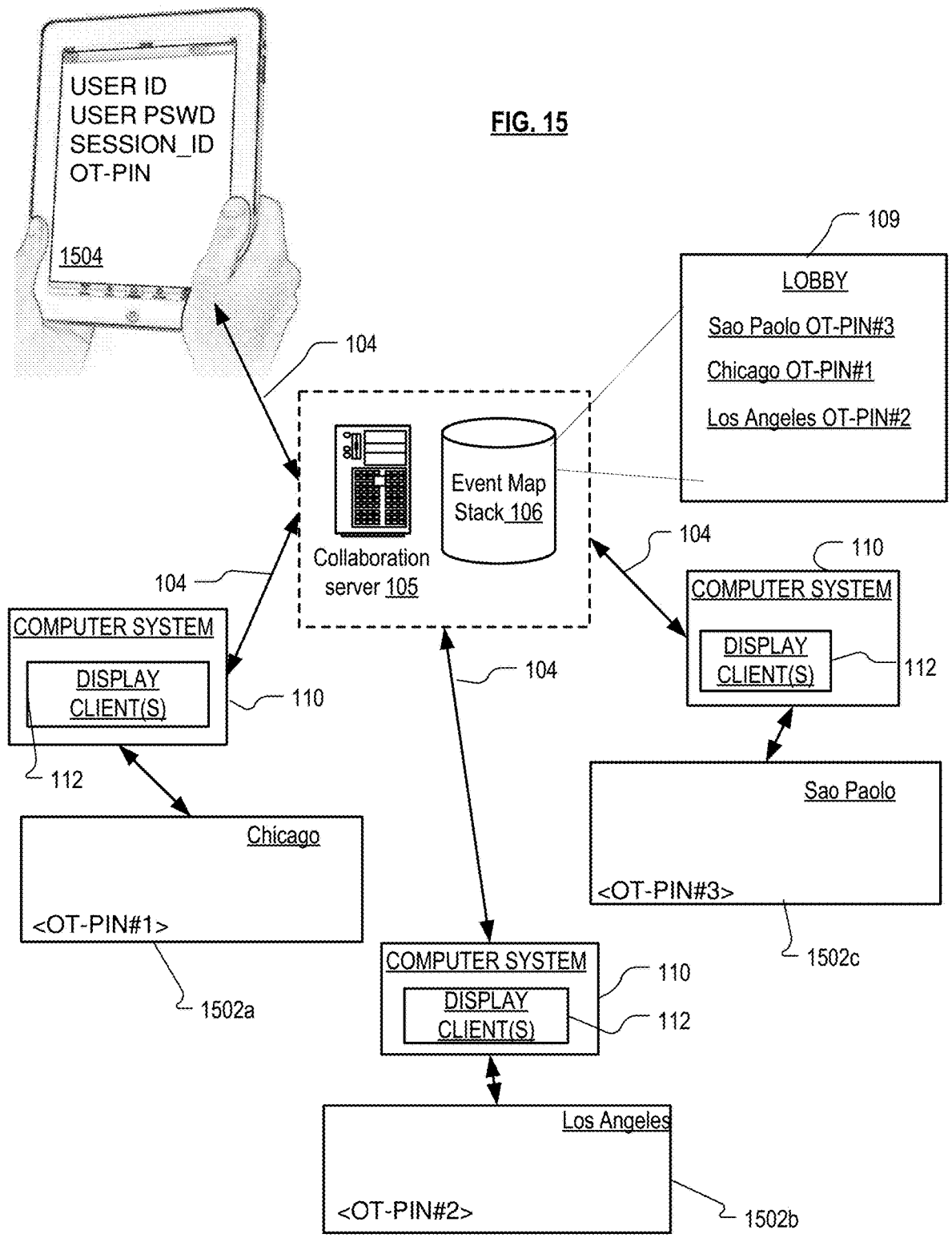
FIG. 15 illustrates, in the style of FIG. 1B, a system supporting distributed display collaboration where there are displays distributed widely.

FIG. 15 illustrates, in the style of FIG. 1B, a system supporting distributed display collaboration where there are displays distributed widely. The system includes a collaboration server 105, with an associated display database 106 storing workspace data. The collaboration server is connected by communication links 104 to a plurality of walls 1502*a*, 1502*b*, 1502*c* which might be located for example in Chicago, Los Angeles and São Paulo. The collaboration server 105 is also coupled to a user device 1504, such as a touchpad or other personal computing platform, which can be expected to be in the possession of a known user. As mentioned above in connection with FIG. 13, the collaboration server 105 can maintain a list of free display walls in a data structure referred to as a "lobby" 109. Associated with each of the display walls is a one-time identification code, including OT-PIN #1 associated with the display wall in Chicago, OT-PIN #2 associated with the display wall in Los Angeles, and OT-PIN #3 associated with the display wall in Sao Paulo. A user in possession of the personal device 1504 can login to the portal managed by the collaboration server 105, entering a user ID and a user password for the purposes of user authentication. Then, the user in possession of the personal device 1504 can provide a workspace identifier and an identification code for a display wall to which the user wants workspace data to be displayed. When the collaboration server successfully authenticates the user, and determines that the user has identified a display wall for which the user is authorized, and a workspace for which the user is authorized, the display client associated with the identified display can be linked to the collaboration event channel and enabled to download workspace data. When the display device is enabled for a given session, it is removed from the lobby 109, and the one-time identification code is deleted or changed. Each time the display is added to the lobby 109, a new one-time identification code can be computed to accept user input that can contribute to the workspace data. The system can include management logic providing workspace data to selected displays based a protocol that insures that a user authorized for the workspace data has physical access the selected display.

Figure 16:
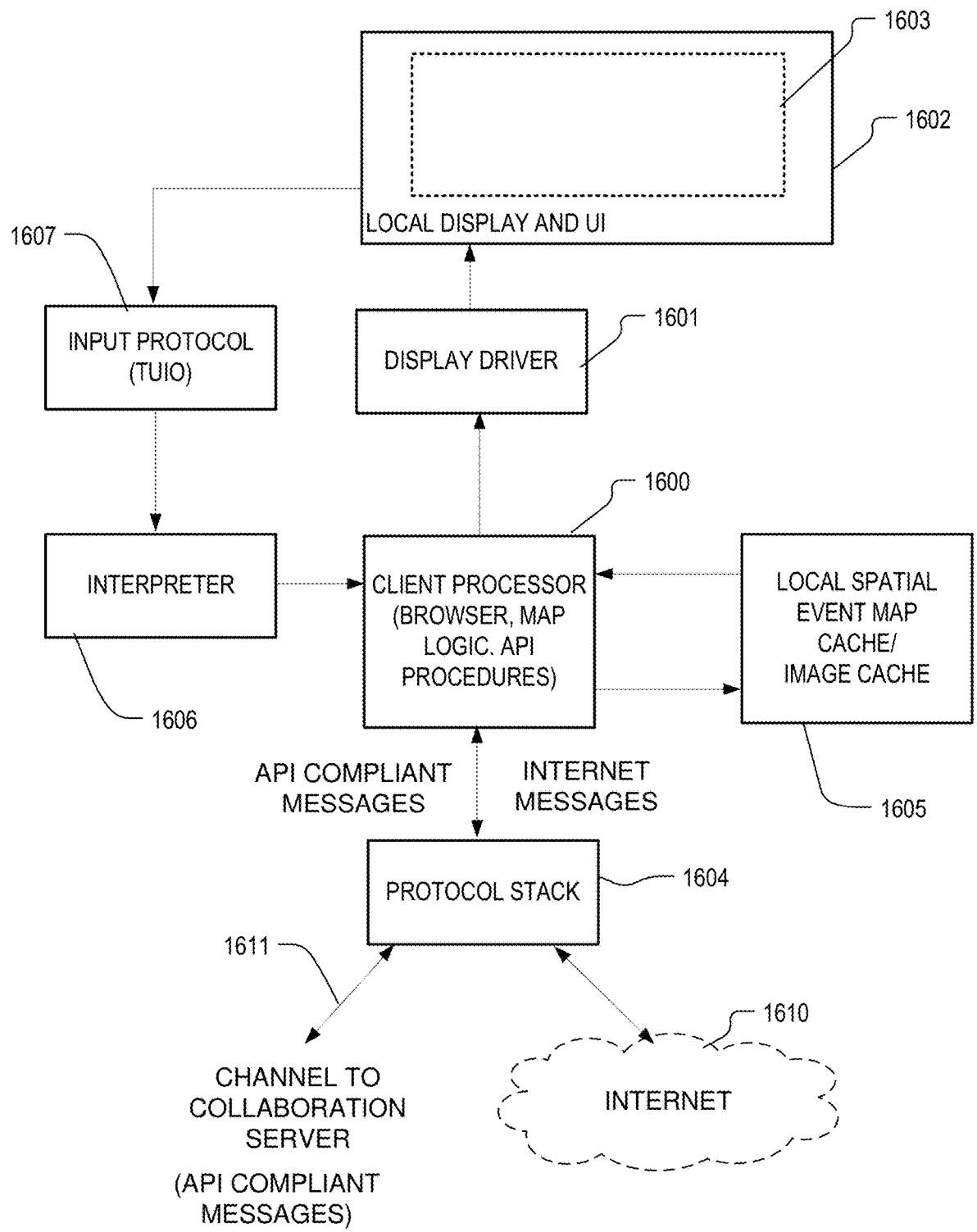
FIG. 16 is a simplified functional block diagram of a client-side network node and display.

FIG. 16 is a simplified diagram of a client-side network node, including a client processor 1600, a display driver 1601, a local display and user interface such as a touchscreen 1602, a protocol stack 1604 including a communication interface controlled by the stack, local memory 1605 storing a cache copy of the live spatial event map and a cache of images and other graphical constructs used in rendering the displayable area, and input protocol device 1607 which executes a input protocol which translates input from a tangible user input device such as a touchscreen, or a mouse, into a form usable by a command interpreter 1606. A suitable input protocol device 1607 can include software compatible with a TUIO industry-standard, for example for interpretation of tangible and multi-touch interaction with the display wall. The protocol stack 1604 receives API compliant messages and Internet messages from the client processor 1600 and as discussed above includes resources to establish a channel 1611 to a collaboration server across which API compliant messages can be exchanged, and a link 1610 to the Internet in support of other communications that serve the local display 1602. The display driver 1601 controls a displayable area 1603 on the local display 1602. The displayable area 1603 can be logically configured by the client processor or other programming resources in the client-side network node. Also, the physical size of the displayable area 1603 can be fixed for a given implementation of the local display. The client processor 1600 can include processing resources such as a browser, mapping logic used for translating between locations on the displayable area 1603 and the workspace, and logic to implement API procedures.

A system for collaboration described herein can include a client-side network node like that of FIG. 16. The client-side network node includes a display having a physical display space, a user input device, a processor and a communication port. The client-side network node is configured with logic:

to establish a link to a server-side network node;

to retrieve from the server-side network node at least part of a spatial event log of events relating to graphical targets having locations in a workspace, entries in the log including a location in the workspace of the graphical target of an event, a time of the event, and a target identifier of the graphical target;

to map a displayable area in the physical display space to a mapped area within the workspace, to identify entries in the spatial event log within the mapped area, render graphical targets identified by the identified entries onto the displayable area;

to accept input data from the user input device creating events relating to modification and creation of graphical targets displayed within the displayable area, and to send messages based upon the events to the server-side network node.

The client-side network node shown in FIG. 16 illustrates an example including an application interface including a process to communicate with the server-side network node.

The client-side network node shown in FIG. 16 illustrates an example configured according to an API, wherein the events include a first class of event designated as history events to be distributed among other client-side network nodes and to be added to the spatial event log in the server-side network node, and a second class of event designated as ephemeral to be distributed among other client-side network nodes but not added to the spatial event log in the server-side network node.

Figure 17:
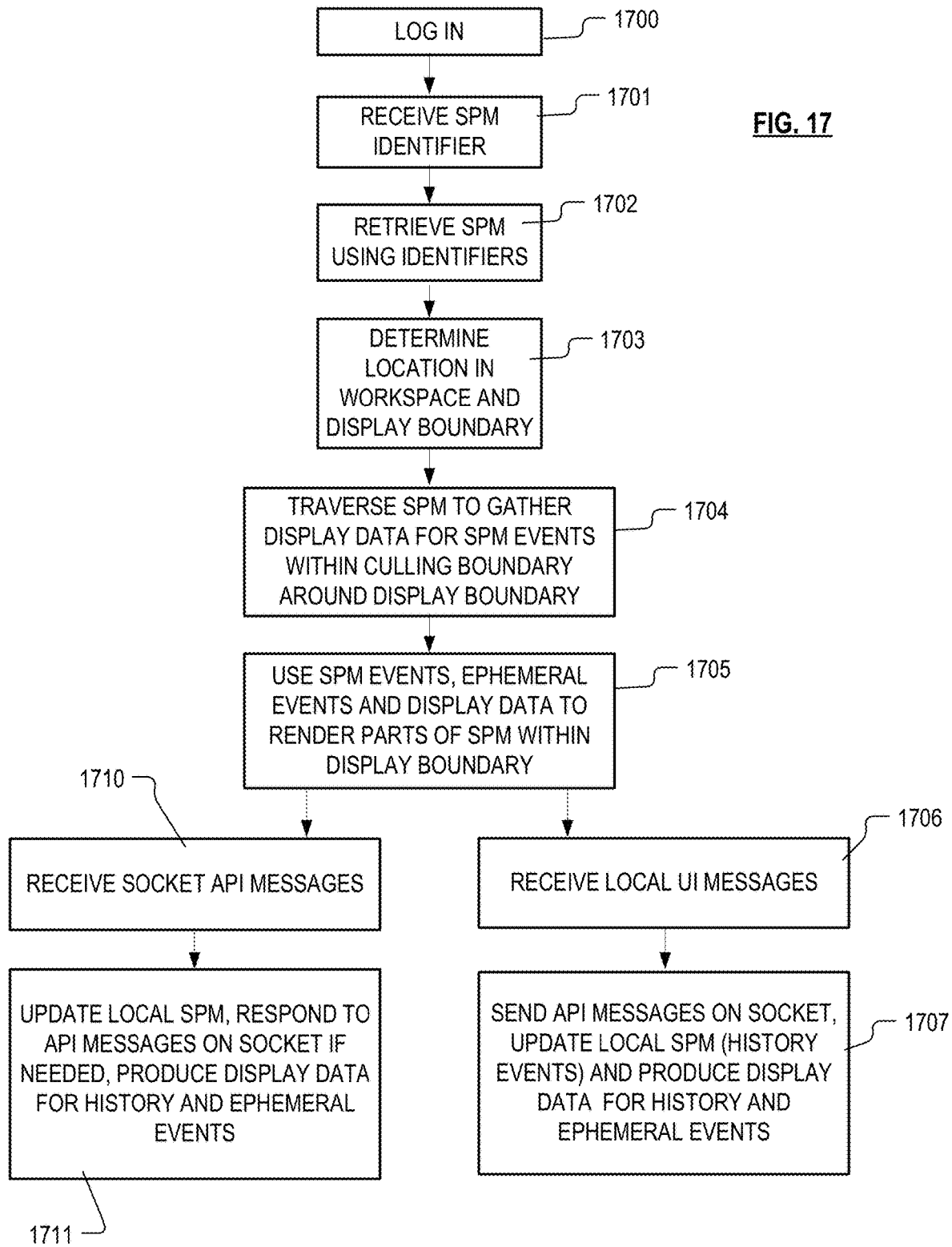
FIG. 17 is a flowchart illustrating operation of a client-side network node like that of FIG. 16.

FIG. 17 is a simplified flow diagram of a procedure executed by the client-side network node. The order illustrated in the simplified flow diagram is provided for the purposes of illustration, and can be modified as suits a particular implementation. Many of the steps for example, can be executed in parallel. In this procedure, a client login is executed (1700) by which the client is given access to a specific collaboration session and its spatial event map. The collaboration server provides an identifier of, or identifiers of parts of, the spatial event map which can be used by the client to retrieve the spatial event map from the collaboration server (1701). The client retrieves the spatial event map, or at least portions of it, from the collaboration server using the identifier or identifiers provided (1702).

For example, the client can request all history for a given workspace to which it has been granted access as follows:

curl http://localhost:4545/<sessionId>/history

The server will respond with all chunks (each its own section of time):

["/<sessionId>/history/<startTime>/<endTime>?b=1"]
["/<sessionId>/history/<startTime>/<endTime>?b=1"]

For each chunk, the client will request the events:

Curl http: //localhost:4545/<sessionId>/history/<startTime>/<endTime>?b=<cache-buster>

Each responded chunk is an array of events and is cacheable by the client:

[
  [
    4,
    "sx",
    "4.4",
    [537, 650, 536, 649, 536, 648, ...],
    {
      "size": 10,
      "color": [0, 0, 0, 1],
      "brush": 1
    },
    1347644106241,
    "cardFling"
  ]
]

The individual messages might include information like position on screen, color, width of stroke, time created etc.

The client then determines a location in the workspace, using for example a server provided focus point, and display boundaries for the local display (1703). The local copy of the spatial event map is traversed to gather display data for spatial event map entries that map to the displayable area for the local display. In some embodiments, the client may gather additional data in support of rendering a display for spatial event map entries within a culling boundary defining a region larger than the displayable area for the local display, in order to prepare for supporting predicted user interactions such as zoom and pan within the workspace (1704). The client processor executes a process using spatial event map events, ephemeral events and display data to render parts of the spatial event map that fall within the display boundary (1705). This process receives local user interface messages, such as from the TUIO driver (1706). Also, this process receives socket API messages from the collaboration server (1710). In response to local user interface messages, the process can classify inputs as history events and ephemeral events, send API messages on the socket to the collaboration server for both history events and ephemeral events as specified by the API, update the cached portions of the spatial event map with history events, and produce display data for both history events and ephemeral events (1707). In response to the socket API messages, the process updates the cached portion of the spatial event map with history events identified by the server-side network node, responds to API messages on the socket as specified by the API, and produce display data for both history events and ephemeral events about which it is notified by the socket messages (1711).

Figure 18:
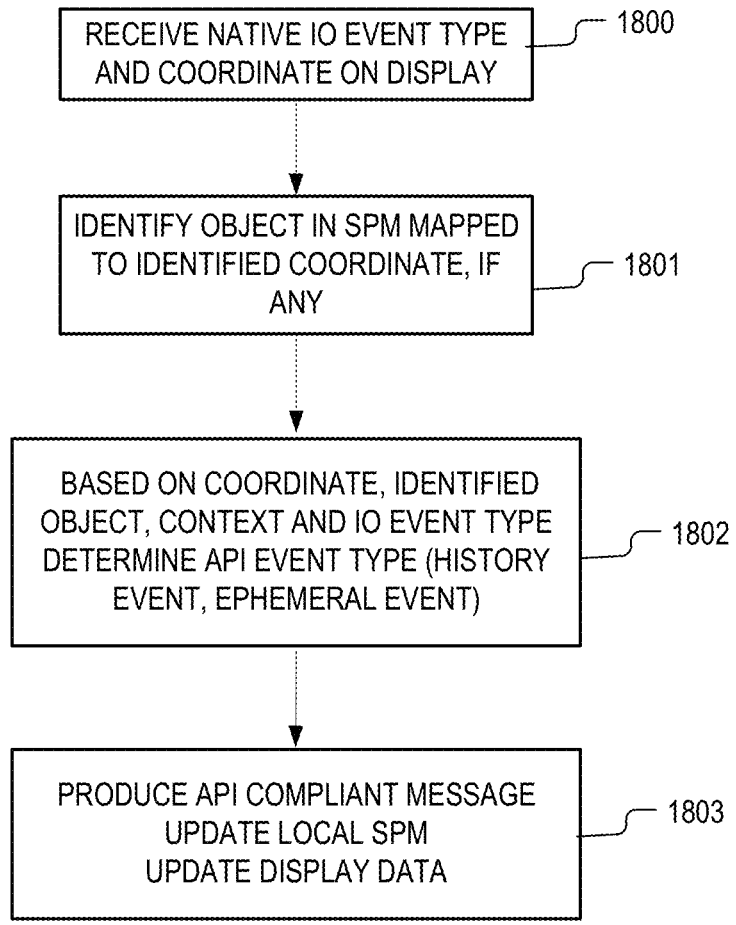
FIG. 18 is a flowchart illustrating a procedure executed by logic in a client-side network node like that of FIG. 16.

FIG. 18 is a simplified flow diagram of a process for interpreting user input executed by a client-side network node. The order illustrated in the simplified flow diagram is provided for the purposes of illustration, and can be modified as suits a particular implementation. Many of the steps for example, can be executed in parallel. The process begins with receiving a native I/O event type message from a tangible user input device, along with a physical coordinate on the display (1800). The process maps the physical coordinate on the display to a coordinate in the workspace and identifies using its local cached copy of the spatial event map, objects in the spatial event map which map to the workspace coordinate, if any (1801). Then, based on the workspace coordinate, the identified object, context and I/O event type, the processor determines an API event type, including whether the event is a history event or ephemeral event (1802). The client-side processor then produces an API compliant message, updates the local cached copy of the spatial event map, and updates the display data (1803). Using a server-side network node and a client-side network node as described here, some basic procedures include logging in and downloading a spatial event map for a session to a client-side network node, and connecting to a workspace channel of live workspace spatial events.

Logging in and downloading spatial event map.

1. The client request authorization to join a collaboration session, and open a workspace.

2. The server authorizes the client to participate in the session, and begin loading the spatial event map for the workspace.

3. The client requests an identification, such as a "table of contents" of the spatial event map associated with the session.

4. Each portion of the spatial event map identified in the table of contents is requested by the client. These portions of the spatial event map together represent the workspace as a linear sequence of events from the beginning of workspace-time to the present. The "beginning of workspace-time" can be considered an elapsed time from the time of initiation of the collaboration session, or an absolute time recorded in association with the session.

5. The client assembles a cached copy of the spatial event map in its local memory.

6. The client displays an appropriate region of the workspace using its spatial event map to determine what is relevant given the current displayable area or viewport on the local display.

Connecting to the Session Channel of Live Spatial Event Map Events:

1. After authorization, a client requests to join a workspace channel.

2. The server adds the client to the list of workspace participants to receive updates via the workspace channels.

3. The client receives live messages from the workspace that carry both history events and ephemeral events, and a communication paradigm like a chat room. For example, a sequence of ephemeral events, and a history event can be associated with moving object in the spatial event map to a new location in the spatial event map.

4. The client reacts to live messages from the server-side network node by altering its local copy of the spatial event map and re-rendering its local display.

5. Live messages consist of "history" events which are to be persisted as undue-double, recorded events in the spatial event map, and "ephemeral" events which are pieces of information that do not become part of the history of the session.

6. When a client creates, modifies, moves or deletes an object by interaction with its local display, a new event is created by the client-side network node and sent across the workspace channel to the server-side network node. The server-side network node saves history events in the spatial event map for the session, and distributes both history events and ephemeral events to all active clients in the session.

7. When exiting the session, the client disconnects from the workspace channel.

A collaboration system can have many, distributed digital displays which are used both to display images based on workspace data managed by a shared collaboration server, and to accept user input that can contribute to the workspace data, while enabling each display to rapidly construct an image to display based on session history, real time local input and real-time input from other displays.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method comprising:
    sending, by a server node and to a client node, at least a portion of a log of entries that identifies events in a workspace,
    wherein an entry in the log, which identifies a particular event, comprises:
        (i) data specifying coordinates within the workspace of an object related to the particular event;
        (ii) data identifying a time of the particular event; and (iii) data identifying an action including at least one of: creation, movement and deletion of the object within the workspace, wherein the log of entries is configured to allow the client node to:
update a memory cache on the client node with the data from the log of entries;
map a displayable area in a display linked to the client node to a mapped area within the workspace; and
display the object identified by the particular event that has a location within the mapped area of the workspace onto the displayable area.

2. The method of claim 1, including receiving messages at an application program interface executed at the server node.

3. The method of claim 1, further comprising receiving messages, at a server node, based upon created events,
wherein the messages based on the created events include a first class of event designated as a history event to be distributed among other client nodes and to be added to the log in the server node, and a second class of event designated as an ephemeral event to be distributed among other client nodes but not added to the log in the server node.

4. The method of claim 1, wherein the object includes at least one of text and a stroke.

5. The method of claim 1, wherein the entries in the log include a parameter identifying a graphical construct used to display the object on the display linked to the client node.

6. The method of claim 1, wherein the entries in the log include a parameter identifying a user associated with the particular event.

7. The method of claim 1, wherein the log of events sent to the client node is further configured to allow the client node to pan and zoom the displayable area relative to the workspace on the display linked to the client node.

8. The method of claim 1, wherein the workspace encompasses an unbounded area.

9. A system comprising:
a server node including a processor configured with logic to implement operations including:
sending, to a client node, a log of entries that identifies events in a workspace,
wherein an entry in the log, which identifies a particular event, comprises:
(i) data specifying coordinates within the workspace of an object related to the particular event;
(ii) data identifying a time of the particular event; and
(iii) data identifying an action including at least one of: creation, movement, and deletion of the object within the workspace,
wherein the log of entries is configured to allow the client node to:
update a memory cache on the client node with the data from the log of entries;
map a displayable area in a display linked to the client node to a mapped area within the workspace; and
display the object identified by the particular event that has a location within the mapped area of the workspace onto the displayable area.

10. The system of claim 9, wherein the logic includes receiving messages at an application interface executed at the server node.

11. The system of claim 9,
wherein the operations further include receiving messages, at the server node, based upon created events, and wherein the messages based on the created events include a first class of event designated as a history event to be distributed among other client nodes and to be added to the log in the server node, and a second class of event designated as an ephemeral event to be distributed among other client nodes but not added to the log in the server node.

12. The system of claim 9, wherein the object includes at least one of text and a stroke.

13. The system of claim 9, wherein the entries in the log include a parameter identifying a graphical construct used to display the object on the display linked to the client node.

14. The system of claim 9, wherein the entries in the log include a parameter identifying a user associated with the particular event.

15. The system of claim 9, wherein the log of events sent to the client node is further configured to allow the client node to pan and zoom the displayable area relative to the workspace on the display linked to the client node.

16. The system of claim 9, wherein the workspace encompasses an unbounded area.

17. A non-transitory computer-readable recording medium having executable instructions recorded thereon, the executable instructions, when executed on one or more processors, causing the one or more processors to implement operations comprising:
sending, by a server node and to a client node, a log of entries that identifies events in a workspace,
wherein an entry in the log, which identifies a particular event, comprises:
(i) data specifying coordinates within the workspace of an object related to the particular event;
(ii) data identifying a time of the particular event; and
(iii) data identifying an action including at least one of: creation, movement and deletion of the object within the workspace,
wherein the log of entries is configured to allow the client node to:
update a memory cache on the client node with the data from the log of entries;
map a displayable area in a display linked to the client node to a mapped area within the workspace; and
display the object identified by the particular event that has a location within the mapped area of the workspace onto the displayable area.

18. The non-transitory computer-readable recording medium of claim 17, wherein the operations further include receiving messages at an application program interface executed at the server node.

19. The non-transitory computer-readable recording medium of claim 17,
wherein the operations further include receiving messages, at the server node, based upon created events, and
wherein the messages based on the created events include a first class of event designated as a history event to be distributed among other client nodes and to be added to the log in the server node, and a second class of event designated as an ephemeral event to be distributed among other client nodes but not added to the log in the server node.

20. The non-transitory computer-readable recording medium of claim 17, wherein the object includes at least one of text and a stroke.

* * * * *